United States Patent
Lemay

(10) Patent No.: US 11,057,335 B2
(45) Date of Patent: Jul. 6, 2021

(54) PORTABLE MULTIFUNCTION DEVICE, METHOD, AND GRAPHICAL USER INTERFACE FOR AN EMAIL CLIENT

(71) Applicant: Apple, Inc., Cupertino, CA (US)

(72) Inventor: Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 15/277,800

(22) Filed: Sep. 27, 2016

(65) Prior Publication Data
US 2017/0019366 A1    Jan. 19, 2017

Related U.S. Application Data

(63) Continuation of application No. 12/242,860, filed on Sep. 30, 2008, now Pat. No. 9,483,755.

(60) Provisional application No. 61/068,584, filed on Mar. 6, 2008, provisional application No. 61/033,788, filed on Mar. 4, 2008.

(51) Int. Cl.
| | |
|---|---|
| *H04L 12/58* | (2006.01) |
| *G06F 3/0481* | (2013.01) |
| *G06Q 10/10* | (2012.01) |
| *G06F 3/0488* | (2013.01) |

(52) U.S. Cl.
CPC ............ *H04L 51/22* (2013.01); *G06F 3/0488* (2013.01); *G06F 3/04817* (2013.01); *G06Q 10/107* (2013.01); *H04L 51/10* (2013.01)

(58) Field of Classification Search
CPC ... H04L 51/22; G06F 3/04817; G06F 3/0488; G06Q 10/107
See application file for complete search history.

(56) References Cited

U.S. PATENT DOCUMENTS

| | | | |
|---|---|---|---|
| 4,763,356 | A | 8/1988 | Day, Jr. et al. |
| 5,283,856 | A | 2/1994 | Gross et al. |
| 5,347,295 | A | 9/1994 | Agulnick et al. |
| 5,388,255 | A * | 2/1995 | Pytlik ............... G06F 16/24539 |
| 5,444,841 | A | 8/1995 | Glaser et al. |

(Continued)

FOREIGN PATENT DOCUMENTS

| | | |
|---|---|---|
| EP | 1674977 A2 | 6/2006 |
| WO | 2008103018 A1 | 8/2008 |

OTHER PUBLICATIONS

"Evolution 2.28", Available at <http://projects.gnome.org/evolution/doc/evolution228.pdf>, Jul. 2007, last accessed Nov. 16, 2012.

(Continued)

*Primary Examiner* — Jung-Mu T Chuang
(74) *Attorney, Agent, or Firm* — Dentons US LLP

(57) ABSTRACT

A computer-implemented method is disclosed for use with a portable electronic device having a display. The method enables switching between electronic inboxes that can be accessed from the electronic device. In some configurations, the method includes, while the device is displaying emails in a first inbox, detecting user selection of a first icon. The method further includes, in response to user selection of the first icon, displaying a set of inbox selection icons; and, in response to user selection of one of the inbox selection icons, displaying emails in a second inbox corresponding to the inbox selection icon selected by the user.

21 Claims, 43 Drawing Sheets

(56) References Cited

U.S. PATENT DOCUMENTS

| | | | | |
|---|---|---|---|---|
| 5,568,540 A | * | 10/1996 | Greco | H04M 1/575 |
| | | | | 379/88.11 |
| 5,608,786 A | * | 3/1997 | Gordon | G06Q 10/107 |
| | | | | 358/402 |
| 5,633,912 A | | 5/1997 | Tsoi | |
| 5,736,974 A | | 4/1998 | Selker | |
| 5,764,518 A | | 6/1998 | Collins | |
| 5,835,084 A | | 11/1998 | Bailey et al. | |
| 5,917,483 A | | 6/1999 | Duncan et al. | |
| 5,950,168 A | | 9/1999 | Simborg et al. | |
| 5,956,486 A | | 9/1999 | Hickman et al. | |
| 6,084,585 A | | 7/2000 | Kraft et al. | |
| 6,088,696 A | | 7/2000 | Moon et al. | |
| 6,137,488 A | | 10/2000 | Kraft et al. | |
| 6,275,858 B1 | * | 8/2001 | Bates | G06F 9/451 |
| | | | | 709/228 |
| 6,301,245 B1 | * | 10/2001 | Luzeski | H04L 51/36 |
| | | | | 370/352 |
| 6,396,513 B1 | * | 5/2002 | Helfman | G06Q 10/107 |
| | | | | 709/206 |
| 6,510,452 B1 | | 1/2003 | Brisebois et al. | |
| 6,826,639 B2 | | 11/2004 | Pasumansky et al. | |
| 6,871,215 B2 | * | 3/2005 | Smith | G06Q 10/107 |
| | | | | 379/88.17 |
| 6,898,563 B1 | | 5/2005 | McFarland | |
| 6,983,308 B1 | * | 1/2006 | Oberhaus | H04L 51/14 |
| | | | | 709/206 |
| 7,076,734 B2 | * | 7/2006 | Wolff | H04N 5/44543 |
| | | | | 348/E5.105 |
| 7,142,646 B2 | * | 11/2006 | Zafar | H04M 3/537 |
| | | | | 379/88.17 |
| 7,177,916 B2 | * | 2/2007 | McDonough | G06Q 10/10 |
| | | | | 709/217 |
| 7,283,808 B2 | * | 10/2007 | Castell | H04L 51/36 |
| | | | | 370/401 |
| 7,349,528 B2 | * | 3/2008 | Schmidt, Jr. | H04M 3/5307 |
| | | | | 379/88.13 |
| 7,421,472 B1 | | 9/2008 | Ross, Jr. | |
| 7,480,867 B1 | | 1/2009 | Racine et al. | |
| 7,519,654 B1 | * | 4/2009 | Smith | H04L 51/066 |
| | | | | 455/466 |
| 7,529,795 B2 | * | 5/2009 | Arav | G06F 3/04842 |
| | | | | 709/204 |
| 7,539,730 B2 | | 5/2009 | Adams et al. | |
| 7,584,254 B2 | | 9/2009 | Adams et al. | |
| 7,603,379 B2 | * | 10/2009 | Kang | H04L 51/36 |
| 7,631,271 B2 | | 12/2009 | Griffith | |
| 7,657,838 B2 | * | 2/2010 | Daniell | G06Q 10/107 |
| | | | | 715/752 |
| 7,689,655 B2 | * | 3/2010 | Hewitt | H04L 51/36 |
| | | | | 709/206 |
| 7,743,105 B2 | | 6/2010 | Bauchot et al. | |
| 7,747,690 B2 | | 6/2010 | Kraenzel et al. | |
| 7,770,121 B2 | | 8/2010 | Jain et al. | |
| 7,788,326 B2 | * | 8/2010 | Buchheit | H04L 51/16 |
| | | | | 709/206 |
| 7,831,665 B2 | * | 11/2010 | Litwiller | H04L 63/083 |
| | | | | 709/205 |
| 7,870,204 B2 | * | 1/2011 | LeVasseur | H04L 51/18 |
| | | | | 709/206 |
| 7,877,703 B1 | | 1/2011 | Fleming | |
| 7,882,433 B2 | * | 2/2011 | Callaway | G09B 19/00 |
| | | | | 715/700 |
| 7,912,904 B2 | | 3/2011 | Buchheit et al. | |
| 7,953,805 B2 | | 5/2011 | Gupta et al. | |
| 8,020,105 B1 | * | 9/2011 | Lemay | H04M 1/72552 |
| | | | | 715/746 |
| 8,218,734 B2 | * | 7/2012 | Bhupati | H04M 1/2478 |
| | | | | 235/382 |
| 8,253,695 B2 | | 8/2012 | Ganatra et al. | |
| 8,296,369 B2 | | 10/2012 | Kamat et al. | |
| 8,307,036 B2 | | 11/2012 | Kamat et al. | |
| 8,341,036 B2 | | 12/2012 | Hartman et al. | |
| 8,375,307 B2 | * | 2/2013 | Kim | H04M 1/72552 |
| | | | | 715/752 |
| 8,402,384 B2 | | 3/2013 | Scott | |
| 8,418,081 B2 | | 4/2013 | Bartek et al. | |
| 8,443,303 B2 | * | 5/2013 | Dunnam | G06F 3/0883 |
| | | | | 345/173 |
| 8,572,194 B2 | * | 10/2013 | Sousa | G06Q 10/107 |
| | | | | 709/206 |
| 8,620,654 B2 | * | 12/2013 | Khouri | H04M 3/53383 |
| | | | | 704/235 |
| 8,762,464 B2 | * | 6/2014 | Van Belle | G06F 3/0482 |
| | | | | 709/203 |
| 9,262,053 B2 | * | 2/2016 | Jegal | G06F 3/0482 |
| 9,408,077 B1 | * | 8/2016 | David | H04L 63/083 |
| 9,483,755 B2 | | 11/2016 | Lemay | |
| 2001/0029524 A1 | * | 10/2001 | Smith | G06Q 10/107 |
| | | | | 709/206 |
| 2002/0013817 A1 | | 1/2002 | Collins et al. | |
| 2002/0055506 A1 | | 5/2002 | Diamond et al. | |
| 2002/0091775 A1 | * | 7/2002 | Morehead | H04L 51/36 |
| | | | | 709/206 |
| 2002/0098831 A1 | * | 7/2002 | Castell | H04M 3/53 |
| | | | | 455/413 |
| 2002/0138582 A1 | * | 9/2002 | Chandra | G06Q 10/107 |
| | | | | 709/206 |
| 2002/0143792 A1 | | 10/2002 | Belu | |
| 2002/0152220 A1 | * | 10/2002 | Kang | H04L 51/00 |
| 2002/0174194 A1 | | 11/2002 | Mooney et al. | |
| 2002/0185357 A1 | | 12/2002 | Haukaas et al. | |
| 2002/0196268 A1 | * | 12/2002 | Wolff | H04N 5/44543 |
| | | | | 715/718 |
| 2003/0055985 A1 | * | 3/2003 | Corb | H04L 29/06027 |
| | | | | 709/227 |
| 2003/0115122 A1 | * | 6/2003 | Slater | G06Q 10/10 |
| | | | | 705/35 |
| 2003/0126136 A1 | | 7/2003 | Omoigui | |
| 2003/0129569 A1 | * | 7/2003 | Callaway | G09B 19/00 |
| | | | | 434/108 |
| 2004/0021676 A1 | | 2/2004 | Chen et al. | |
| 2004/0054627 A1 | | 3/2004 | Rutledge | |
| 2004/0068695 A1 | * | 4/2004 | Daniell | G06Q 10/107 |
| | | | | 715/234 |
| 2004/0076272 A1 | * | 4/2004 | Zafar | H04M 3/537 |
| | | | | 379/88.13 |
| 2004/0083226 A1 | | 4/2004 | Eaton | |
| 2004/0119745 A1 | | 6/2004 | Bartek et al. | |
| 2004/0133564 A1 | | 7/2004 | Gross et al. | |
| 2004/0137884 A1 | * | 7/2004 | Engstrom | H04L 51/16 |
| | | | | 455/414.1 |
| 2004/0137955 A1 | * | 7/2004 | Engstrom | H04M 1/72547 |
| | | | | 455/566 |
| 2004/0139162 A1 | | 7/2004 | Adams et al. | |
| 2004/0139163 A1 | * | 7/2004 | Adams | G06Q 10/107 |
| | | | | 709/206 |
| 2004/0254996 A1 | * | 12/2004 | Yabe | H04L 51/12 |
| | | | | 709/206 |
| 2004/0267905 A1 | * | 12/2004 | McDonough | G06Q 10/10 |
| | | | | 709/219 |
| 2005/0005235 A1 | | 1/2005 | Satterfield et al. | |
| 2005/0018819 A1 | * | 1/2005 | Schmidt, Jr. | H04M 3/5307 |
| | | | | 379/88.13 |
| 2005/0043968 A1 | | 2/2005 | Sauerwald | |
| 2005/0060638 A1 | * | 3/2005 | Mathew | G06Q 10/10 |
| | | | | 715/255 |
| 2005/0099654 A1 | | 5/2005 | Chen | |
| 2005/0160372 A1 | | 7/2005 | Gruen et al. | |
| 2005/0165824 A1 | | 7/2005 | Farnham et al. | |
| 2005/0193351 A1 | | 9/2005 | Huoviala | |
| 2005/0222985 A1 | | 10/2005 | Buchheit et al. | |
| 2005/0223058 A1 | * | 10/2005 | Buchheit | G06F 16/248 |
| | | | | 709/203 |
| 2005/0262203 A1 | | 11/2005 | Buchheit et al. | |
| 2005/0283520 A1 | | 12/2005 | Gardner et al. | |
| 2006/0023849 A1 | | 2/2006 | Timmins et al. | |
| 2006/0026521 A1 | | 2/2006 | Hotelling et al. | |
| 2006/0047811 A1 | | 3/2006 | Lau et al. | |

(56) References Cited

U.S. PATENT DOCUMENTS

| | | | |
|---|---|---|---|
| 2006/0072723 A1* | 4/2006 | Chung | H04L 51/14 379/93.24 |
| 2006/0095506 A1* | 5/2006 | Scott | G06Q 10/107 709/203 |
| 2006/0123360 A1 | 6/2006 | Anwar et al. | |
| 2006/0125803 A1 | 6/2006 | Westerman et al. | |
| 2006/0155809 A1* | 7/2006 | Arav | G06Q 10/107 709/204 |
| 2006/0168025 A1 | 7/2006 | Jain | |
| 2006/0250834 A1 | 11/2006 | Chinn et al. | |
| 2006/0277460 A1* | 12/2006 | Forstall | G06F 16/9577 715/234 |
| 2007/0005715 A1* | 1/2007 | LeVasseur | H04L 63/145 709/206 |
| 2007/0011258 A1 | 1/2007 | Khoo | |
| 2007/0033258 A1 | 2/2007 | Vasilaky et al. | |
| 2007/0050697 A1 | 3/2007 | Lewis-Bowen et al. | |
| 2007/0061369 A1 | 3/2007 | Folting et al. | |
| 2007/0061738 A1 | 3/2007 | Taboada et al. | |
| 2007/0106570 A1 | 5/2007 | Hartman et al. | |
| 2007/0143703 A1 | 6/2007 | Griffith | |
| 2007/0233788 A1 | 10/2007 | Bender | |
| 2007/0280179 A1 | 12/2007 | Van Belle et al. | |
| 2007/0282957 A1* | 12/2007 | Van Belle | G06F 3/0482 709/206 |
| 2007/0294617 A1 | 12/2007 | Kroeger | |
| 2008/0022215 A1 | 1/2008 | Lee et al. | |
| 2008/0034381 A1 | 2/2008 | Jalon et al. | |
| 2008/0086703 A1 | 4/2008 | Flynt et al. | |
| 2008/0094369 A1 | 4/2008 | Ganatra et al. | |
| 2008/0098327 A1 | 4/2008 | Berkowitz et al. | |
| 2008/0153459 A1* | 6/2008 | Kansal | H04L 51/36 455/412.1 |
| 2008/0256469 A1 | 10/2008 | Jain et al. | |
| 2008/0261569 A1* | 10/2008 | Britt | G06Q 10/107 455/414.1 |
| 2008/0263473 A1 | 10/2008 | Becker et al. | |
| 2008/0281813 A1 | 11/2008 | Moody et al. | |
| 2008/0306972 A1* | 12/2008 | Wilkin | H04L 51/066 |
| 2009/0083387 A1 | 3/2009 | Gardner et al. | |
| 2009/0106674 A1 | 4/2009 | Bray et al. | |
| 2009/0106750 A1 | 4/2009 | Siwick et al. | |
| 2009/0113328 A1 | 4/2009 | Leonard | |
| 2009/0138562 A1* | 5/2009 | Schmulen | G06Q 10/107 709/206 |
| 2009/0144655 A1* | 6/2009 | Hardy | H04L 51/22 715/803 |
| 2009/0177754 A1* | 7/2009 | Brezina | G06F 16/9535 709/206 |
| 2009/0214034 A1 | 8/2009 | Mehrotra et al. | |
| 2009/0222286 A1* | 9/2009 | Elsholz | G16H 10/60 705/3 |
| 2009/0228807 A1 | 9/2009 | Lemay | |
| 2009/0327972 A1* | 12/2009 | McCann | G06Q 10/107 715/853 |
| 2010/0103127 A1 | 4/2010 | Park et al. | |
| 2010/0104127 A1 | 4/2010 | Cobb | |
| 2010/0114600 A1* | 5/2010 | Carosso | G16H 10/20 705/2 |
| 2010/0162180 A1* | 6/2010 | Dunnam | G06F 3/04883 715/863 |
| 2010/0208876 A1* | 8/2010 | Tsuei | H04M 1/27455 379/142.04 |
| 2010/0235759 A1* | 9/2010 | Kang | H04L 51/00 715/752 |
| 2010/0318923 A1* | 12/2010 | Kim | G06Q 10/107 715/752 |
| 2011/0022674 A1* | 1/2011 | Callanan | G06Q 10/107 709/206 |
| 2011/0126126 A1 | 5/2011 | Blair | |
| 2011/0238508 A1 | 9/2011 | Koningstein | |
| 2011/0289574 A1 | 11/2011 | Hull et al. | |
| 2011/0314384 A1* | 12/2011 | Lindgren | G06Q 10/107 715/739 |
| 2012/0191716 A1* | 7/2012 | Omoigui | H01L 27/14647 707/740 |
| 2013/0251122 A1* | 9/2013 | Nikiforou | G06Q 10/107 379/88.14 |
| 2014/0046945 A1* | 2/2014 | Deolalikar | G06F 16/93 707/737 |
| 2015/0363092 A1* | 12/2015 | Morton | H04L 51/046 715/752 |

OTHER PUBLICATIONS

Apple.com, "MailCoaster", Available at <http://www.apple.com/webapps/productivity/mailcoaster.html>, Feb. 7, 2008, 1 page.

Block, R., "The iPhone's Long-Missing Two-Pane Email Client", Available at <http://www.ryanblock.com/2008/01/the-iphones-long-missing-two-pane-email-client/>, Jan. 18, 2008, 8 pages.

Comer et al., "Conversation-Based Mail", ACM Transactions on Computer Systems, vol. 4, No. 4, Nov. 1986, pp. 299-319.

Dailytips.net, "Add CC and BCC Fields to Windows Live Mail", Daily Tech Tips & Updates, available at <http://dailytips.net76.net/?p=442>, retrieved on May 31, 2015, 5 pages.

Final Office Action received for U.S. Appl. No. 11/850,630, dated Jan. 28, 2011, 20 pages.

Final Office Action received for U.S. Appl. No. 12/242,860, dated Feb. 2, 2012, 15 pages.

Final Office Action received for U.S. Appl. No. 12/242,860, dated May 16, 2013, 18 pages.

Final Office Action received for U.S. Appl. No. 12/242,860, dated Oct. 10, 2014, 18 pages.

International Preliminary Report on Patentability received for PCT Patent Application No. PCT/US2007/077771, dated Mar. 10, 2009, 7 pages.

International Search Report and Written Opinion received for PCT Application No. PCT/US2007/077771, dated Jun. 11, 2008, 9 pages.

Jordan, M., "Quick look in Leopard", Mac Tips, Available online at:<http://www.mactips.info/2007/11/quick-look-in-leopard>, retrieved on Nov. 7, 2007, 6 pages.

Ncmail, "Microsoft Outlook 2003 Email User's Guide", Available at <http://www.ncmail.net/documents/NCMail-Outlook-2003-Email-User-Guide-v1.0.pdf>, Revision 1.0 on Nov. 10, 2007, last accessed Nov. 6, 2012.

Non Final Office Action received for U.S. Appl. No. 12/242,860, dated Jun. 4, 2015, 14 pages.

Non-Final Office Action received for U.S. Appl. No. 11/850,630, dated Nov. 14, 2011, 16 pages.

Non-Final Office Action received for U.S. Appl. No. 11/850,630, dated Sep. 16, 2010, 17 pages.

Non-Final Office Action received for U.S. Appl. No. 12/242,860, dated Aug. 25, 2011, 11 pages.

Non-Final Office Action received for U.S. Appl. No. 12/242,860, dated Feb. 24, 2014, 14 pages.

Non-Final Office Action received for U.S. Appl. No. 12/242,860, dated Nov. 30, 2012, 15 pages.

Notice of Allowance received for U.S. Appl. No. 11/850,630, dated Mar. 12, 2012, 10 pages.

Notice of Allowance received for U.S. Appl. No. 12/242,860, dated Jun. 16, 2016, 11 pages.

Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.

Pogue, David, "Switching to the Mac—Tiger Edition", O'Reilly Publication, 2005.

Postel, "Simple Mail Transfer Protocol (SMTP-RFC821)", available at <http://tools.ietf.org/html/rfc821>, Aug. 1982.

Tidwell, J., "Two-Panel Selector", From Designing Interfaces, Copyright © 2006 O'Reilly Media, Inc., pp. 31-33.

Tidwell, Jenifer, "Animated Transition", Designing Interfaces, Patterns for effective Interaction Design, First Edition, Nov. 2005, 4 pages.

(56) References Cited

OTHER PUBLICATIONS

Tidwell, Jenifer, "Designing Interfaces", Some Chapter, Nov. 21, 2005, 4 pages.
Time-Tripper, "UI Patterns and Techniques, Overview Plus Detail", Available on <http://www.time-tripper.com./uipatterns/Overview_Plus_Detail>, Sep. 3, 2009, 3 pages.
Wikipedia, "Mail (application)", Available at <http://en.wikipedia.org.wiki/Apple_Mail>, Wikipedia, the free encyclopedia, last modified Sep. 3, 2009, 3 pages.

* cited by examiner

1300

```
(At a portable electronic device having a display:)
Switch between electronic inboxes that can be accessed from the electronic
device                                                                                    1302
```
↓  ⎯1304

```
Display a first icon while displaying first contents of a first inbox.    ⎯1306
    The first icon includes status information related to the inboxes
    corresponding to the inbox selection icons.
        Status information is conveyed using display attributes of the first icon.
                                                                                      1308
        The device updates the status information by changing color of at
        least a portion of the first icon to indicate presence of new items in at
        least one of the inboxes corresponding to the inbox selection icons.
                                                                                      1310
```
↓  ⎯1312

```
In response to user selection of the first icon, the device displays a set of inbox
selection icons.
    Each inbox selection icon includes an inbox identifier for a respective
    electronic inbox                                                              1314

Each inbox selection icon includes an inbox counter indicating a total
    number of unread items in the respective electronic inbox           1316

Partially displaying the first inbox as a peel-away page and display the
    inbox selection icons in display space not occupied by the partially
    displayed first inbox.                                                        1322

The peel-away page is represented as one or more of: a curled-up page
    or a folded page                                                              1324

In response to user selection of the partially displayed first inbox, the
    device displays first contents of the first inbox.                     1326
```
↓  ⎯1318

```
The device displays status information related to the inboxes corresponding to
the inbox selection icons.
    The status information is conveyed (1320) using a badge associated with
    the icon                                                                       1320
```
↓

```
In response to user selection of one of the inbox selection icons, the device
displays second contents of a second inbox corresponding to the inbox selection
icon selected by the user.                                                     1328
```

| (At a portable electronic device having a display:) |
| Display contents of a plurality of electronic inboxes that can be accessed from the electronic device. 1342 |

↓

| Display a first icon while displaying first contents of a first inbox. 1344 |

↓

| In response to user selection of the first icon, the device displays unified contents of the plurality of electronic inboxes. 1346 |
| The electronic inboxes comprise email inboxes. 1348 |

↓

| Determine the plurality of electronic inboxes automatically by identifying accounts used by the user on the electronic device. 1350 |

↓

| Display a second icon while displaying the unified contents of the plurality of electronic inboxes. 1352 |

↓

| In response to user selection of the second icon, the device displays a list of the plurality of electronic inboxes. 1354 |

↓

| In response to user selection of an item in the list of the plurality of electronic inboxes, the device displays contents of a second inbox corresponding to the selected item. 1356 |

| (At a portable electronic device having a display and a user input device:) |
| Provide a list of SMTP servers that can be employed by a user of the electronic device to send email. 1362 |

↓

| When an attempt to send an email message via a first one of the SMTP servers is unsuccessful, repeatedly attempt to send the email message via second ones of the SMTP servers until the email is successfully sent. 1364 |

(At a portable electronic device having a display and a user input device:)
Receive a plurality of emails at the electronic device.   1372

Identifies at least a first email that is part of an email thread having a plurality of thread members.   1374

Determine degree of similarity of at least a subject and a sender identity associated with the thread members.   1378

Determine that the first email is part of the first thread based on the degree of similarity and one or more heuristics relating to determining thread membership.   1380

The heuristics are applied computationally by the electronic device.   1382

Display a plurality of email descriptors corresponding to at least a subset of the emails, including the first email   1384

Display a first thread descriptor in conjunction with the email descriptor that corresponds to the first email. The first thread descriptor indicates a number of the thread members associated with the first thread.   1386

In response to user selection of the email descriptor corresponding to the first email, display a second set of email descriptors for the email thread that includes the first email.   1388

(At a portable electronic device having a display and a user input device:)
Receive a plurality of emails at the electronic device.
1392

The device identifies at least a first email that includes one or more associated image files.
1394

Display a representation of the one or more associated image files in context of the first email.
1396

In response to user selection of the representation, display a set of image file options including an option to display a slideshow of the attached photos.
1398

In response to user selection of the option to display a slideshow of the attached photos, display the slideshow of the attached photos.
1400

If there are other non-image file attachments to the first email, select only the image-file attachments for display in the slideshow.
1402

(At a portable electronic device having a touch screen display:)
Receive an emails having a plurality of photo attachments.  1422

Detect a user gesture on or near the touch screen display.  1424

> The detected user gesture is a finger touch on a displayed image corresponding to one of the photo attachments.  1426

> The detected user gesture is a finger touch on a displayed icon corresponding to one of the photo attachments.  1428

In response to detecting the gesture, display a plurality of options for managing the plurality of photo attachments, including an option to save the plurality of photo attachments and an option to display a slideshow of the plurality of photo attachments.  1430

Detect user selection of the option to display a slideshow.  1432

In response to detecting the user selection of the option to display a slideshow, the device displays a slideshow of the plurality of photo attachments.  1434

> The slideshow includes display of a sequence of photos corresponding to the plurality of photo attachments and display of a file name for each respective photo in the slideshow when the respective photo is displayed.  1440

> The slideshow includes display of a sequence of photos corresponding to the plurality of photo attachments. The device detects a finger swipe gesture during display of the slideshow, and in response, advances the slideshow to a next photo in the sequence of photos.  1442

Detect user selection of the option to save the plurality of photo attachments.  1436

In response to detecting the user selection of the option to save the plurality of photo attachments, save the plurality of photo attachments.  1438

(At an electronic device with a display and a user input device:)
Display a first user interface in which a user can compose an email. The first user interface includes a collapsed field corresponding to CC, BCC and From address information                                              1452

In response to user selection of the collapsed field, display first individual CC, BCC and From fields, and enable a user to enter address values in at least one of the first CC, BCC and From fields.                                              1454

Enable the user to enter address values comprises displaying a virtual keyboard that overlays a portion of the first interface.                                              1456

Enable the user to enter an address value in the From field that is different from a default From address value associated with the user.
                                                                                                                                1460

Following completion of user entry of address values in at least one of the first CC, BCC and From fields, display a recollapsed field in place of the collapsed field. The recollapsed field includes: at least one second individual field displaying respective values of any of the CC, BCC and From fields entered by the user; and, if there are at least two of the CC, BCC or From fields in which the user did not enter a respective value, a second collapsed field corresponding to such at least two of the CC, BCC or From fields.                                              1458

(At an electronic device with a display and a user input device:)
Provide a list of SMTP servers that can be employed by the electronic device to send email.
1472

When the device fails to successfully transmit a first email via one of the listed SMTP servers, attempt to transmit the first email via another of the listed SMTP servers.
1474

One of the SMTP servers is characterized as a default server and other SMTP servers on the list of SMTP servers are characterized as alternate servers. A first attempt by the electronic device to send the email is via the default SMTP server.
1476

Figure 13H

PORTABLE MULTIFUNCTION DEVICE, METHOD, AND GRAPHICAL USER INTERFACE FOR AN EMAIL CLIENT

RELATED APPLICATIONS

This application is a continuation of U.S. patent application Ser. No. 12/242,860, "Portable Multifunction Device, Method, and Graphical User Interface for an Email Client" filed Sep. 30, 2008, which claims priority to U.S. Provisional Patent Application Ser. Nos. 61/033,788, "Portable Multifunction Device, Method and Graphical User Interface for an Email Client," tiled Mar. 4, 2008, and 61/068,584, "Portable Multifunction Device, Method and Graphical User Interface for an Email Client," filed Mar. 6, 2008. Both of these applications are incorporated by reference herein their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. patent application Ser. No. 11/850,630, "Email Client for a Portable Multifunction Device," filed Sep. 5, 2007; and (10) U.S. patent application Ser. No. 11/850,635, "Touch Screen Device, Method, and Graphical User Interface for Determining Commands by Applying Heuristics," filed Sep. 5, 2007. All of these applications are incorporated by reference herein.

TECHNICAL FIELD

The disclosed embodiments relate generally to portable electronic devices, and more particularly, to email clients on portable communication devices.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In particular, many conventional user interfaces for displaying, organizing, managing, and creating emails on a portable communication device are inflexible. The combination of small screens for displaying emails and email lists, complicated pushbutton key sequences, and complex menu hierarchies results in email user interfaces that are not user-friendly. As a result, using an email client on a portable communication device can be frustrating.

In addition, many users of portable communication devices have multiple email accounts that they want to access on their devices. However, given the small displays and cramped user interfaces of many such devices it is often unwieldy to switch between those different accounts. Also, it is possible that sending email from a particular email account is not possible when a user is connected to an email server associated with a different email account. Finally, in addition to using email for text communications, many users also send digital media files (e.g., photos) via email. It is often difficult for a user to interact with such digital media files from within an email application provided by the portable device.

Accordingly, there is a need for portable multifunction devices with more transparent and intuitive user interfaces for displaying, organizing, managing, and creating emails that are easy to use, configure, and/or adapt. There is also a need for portable multifunction devices that provide convenient access to multiple email accounts and digital media content that is associated with emails.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, in addition to emailing, the functions may include telephoning, video conferencing, instant messaging, blogging, digital photographing, digital videoing, web browsing, digital music playing, and/or digital video playing. Instructions for performing these functions may be included in a computer readable storage medium or other computer program product configured for execution by one or more processors.

Some embodiments are directed to providing fast in-box switching among multiple email accounts. In some embodiments, a user of a portable multifunction device can switch easily (e.g., with no more than 2 finger taps) between different email accounts and/or inboxes. The email accounts, for example, might include Gmail, AOL, and corporate email accounts.

One embodiment provides a dedicated icon at the bottom of an email application user interface (in some embodiments, the icon can resemble an eye). In response to a user clicking on the icon (i.e., a first click), an active email screen (i.e., the one listing the emails from one of the accounts) appears to peel back, revealing a second underlying page with a list of the user's email accounts. The user can cause the screen to display the inbox of a different email account by simply selecting one of the listed accounts (i.e., a second finger tap). The emails from the selected, different account are shown on the active email screen as the top page rolls back. In a different embodiment, a user can navigate in one finger tap to a user interface that lists all of their accessible email accounts. By a second finger tap on one of the account names, the user can view the emails associated with the inbox of that account.

In accordance with some embodiments, a computer-implemented method is performed at a portable multifunction device with a touch screen display. The computer-implemented method includes: on a portable electronic device having a display, switching between electronic inboxes that can be accessed from the electronic device, which includes: while displaying first contents of a first inbox, displaying a first icon; in response to user selection of the first icon, displaying a set of inbox selection icons; and in response to user selection of one of the inbox selection icons, displaying second contents of a second inbox corresponding to the inbox selection icon selected by the user.

Some embodiments are directed to providing a unified inbox from which emails from multiple email accounts can be accessed from the same user interface screen. In some embodiments, the unified inbox view can be accessed using a single button that is shown at the top of an inbox UI when the user is viewing thereon email from a single inbox (but only when there is more than one account in the email accounts view). Mail from all available accounts (or, optionally, a selected subset of the accounts) is shown when an "All accounts" button is selected. In some embodiments, emails from the multiple accounts are interleaved by time and date. Emails can also be sorted by sender or other criteria. The emails can also be color-coded based on the account from which they originate. In other embodiments, the emails associated with a particular account can be shown on separate display panels on the unified inbox UI.

Some embodiments allow a user to send email through an email server other than their default email server. For example, a user might not be able to send Gmail messages through a corporate email server. Some embodiments provide a list of SMTP (Simple Mail Transfer Protocol) servers that can be used to send email. For example, a user in the above situation could simply reset his or her portable multifunction device to operate through a Gmail server rather than a corporate server. In some embodiments, a user can populate the list of servers with information for various email services. In other embodiments, an email application that runs on the portable multifunction device suggests SMTP server information based on the user's known email accounts. In some embodiments, a user can select primary and alternate/backup SMTP servers. Then, if an email fails to go through using the primary SMTP server, the portable multifunction device can automatically attempt to resend the email using one or more of the alternative SMTP servers.

In some embodiments, a user is able to download to and display on a portable multifunction device a collection of emails associated with a particular email thread. The emails that are associated with a particular thread are identified on the device using programmed heuristics. In some embodiments, a user can select an email that is part of a thread, in response to which the thread view of that email (in context with other emails in the thread) slides in to view on the device's display, with the existing inbox view of the emails sliding out of view on the device's display along the same trajectory. In different embodiments the trajectory of the two screens can be upwards, downwards, at an angle, or sideways.

Some embodiments of a touch screen device provide a slideshow capability for photos that are attached to or embedded in email. In some embodiments, in response to a user tap on an inline photo in an email, the device displays multiple options for handling the embedded photo or photos. One option allows a user to view the attached or embedded photos as a slideshow. Another option allows a user to store a an attached or embedded photo on their device. Yet another option enables the user to store all of the attached or embedded photos on their device. In some embodiments, if there are other attachments to an email that are not photos, then only the photos are selected for the "save all photos" and "slideshow" operations.

The disclosed email client for a portable multifunction device provides transparent and intuitive user interfaces for displaying, organizing, managing, and creating emails that are easy to use, configure, and/or adapt. The disclosed device thus reduces the frustrations involved with using portable electronic devices for email.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 13A-13H are flow diagrams illustrating a process for managing emails and email lists in accordance with some embodiments.

DESCRIPTION OF EMBODIMENTS

Figure 1A:
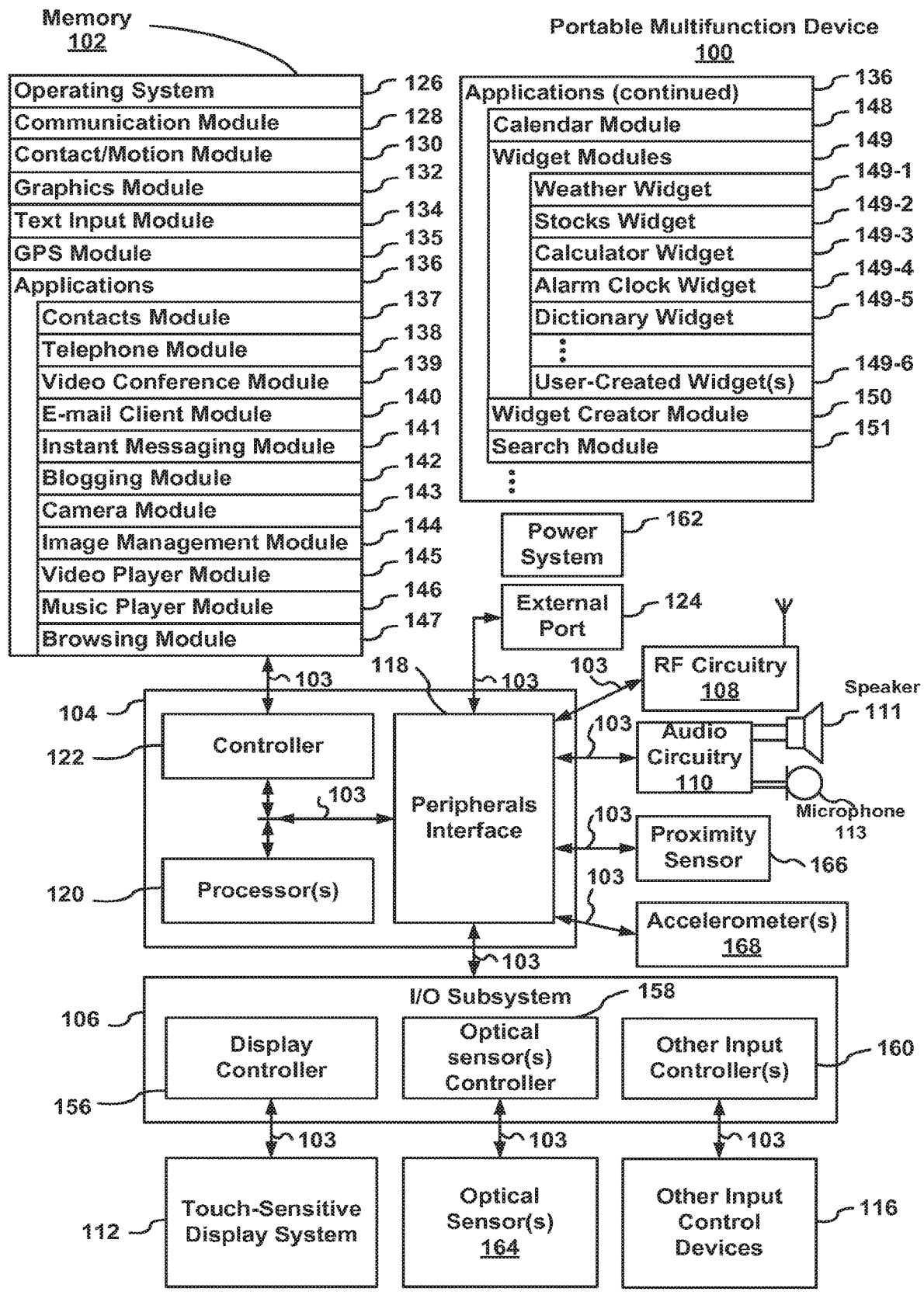
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers that may include one or more other physical user-interface devices, such as a physical click wheel, a physical keyboard, a mouse and/or a joystick.

In some embodiments, in addition to the email application, the device supports a variety of applications, such as one or more of the following: a telephone application, a video conferencing application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
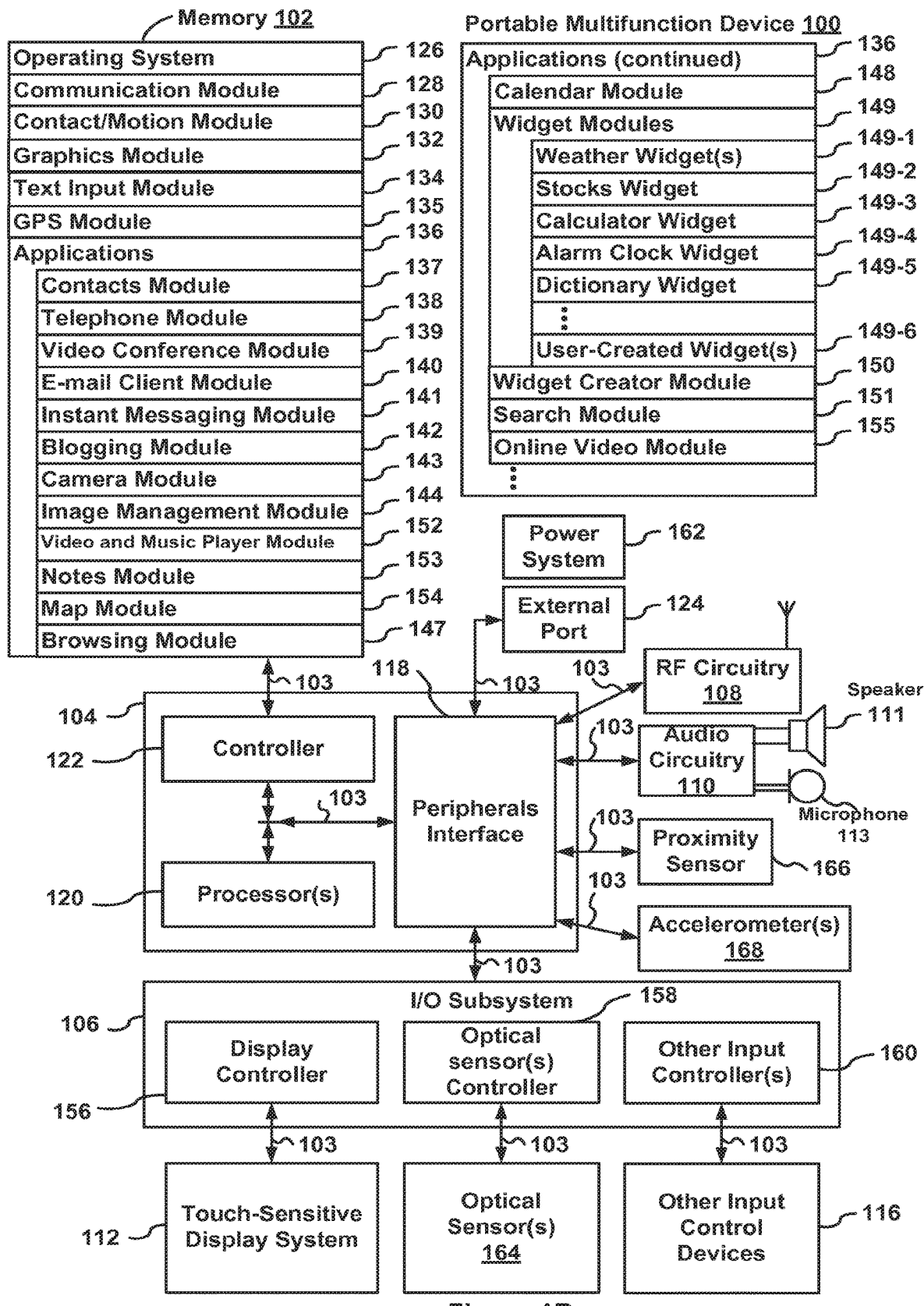

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.1 in), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 3005; Ser. No. 11/240,788, "Proximity Detector In Handheld Device," filed Sep. 30, 3005; Ser. No. 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
    a contacts module 137 (sometimes called an address book or contact list);
    a telephone module 138;
    a video conferencing module 139;
    an e-mail client module 140;
    an instant messaging (IM) module 141;
    a blogging module 142;
    a camera module 143 for still and/or video images;
    an image management module 144;
    a video player module 145;
    a music player module 146;
    a browser module 147;
    a calendar module 148;
    widget modules 149, which may include weather widget 149-1, stocks widget 149-2, calculator widget 149-3, alarm clock widget 149-4, dictionary widget 149-5, and other widgets obtained by the user, as well as user-created widgets 149-6;
    widget creator module 150 for making user-created widgets 149-6;
    search module 151;
    video and music player module 152, which merges video player module 145 and music player module 146;
    notes module 153;
    map module 154; and/or
    online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
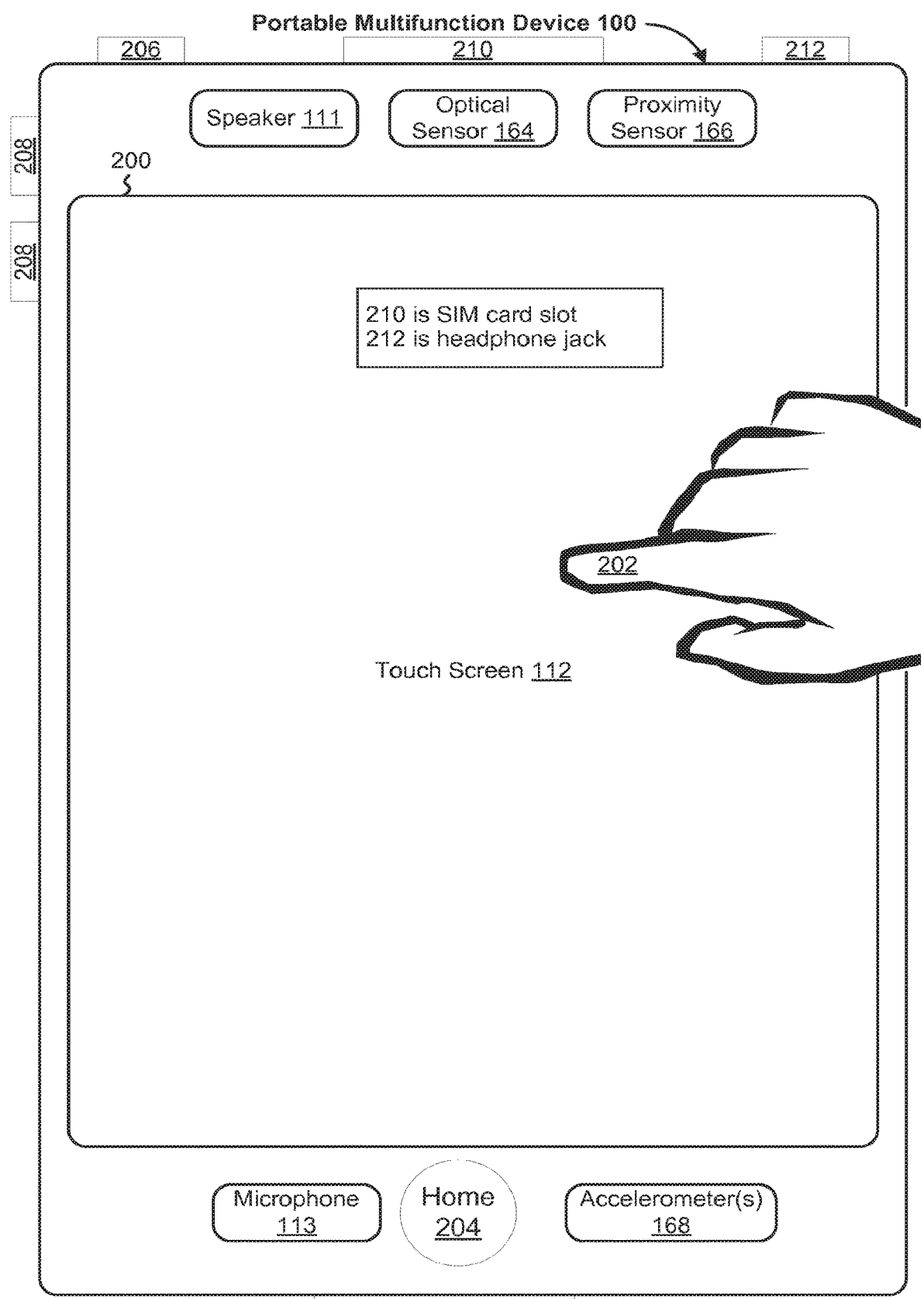
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
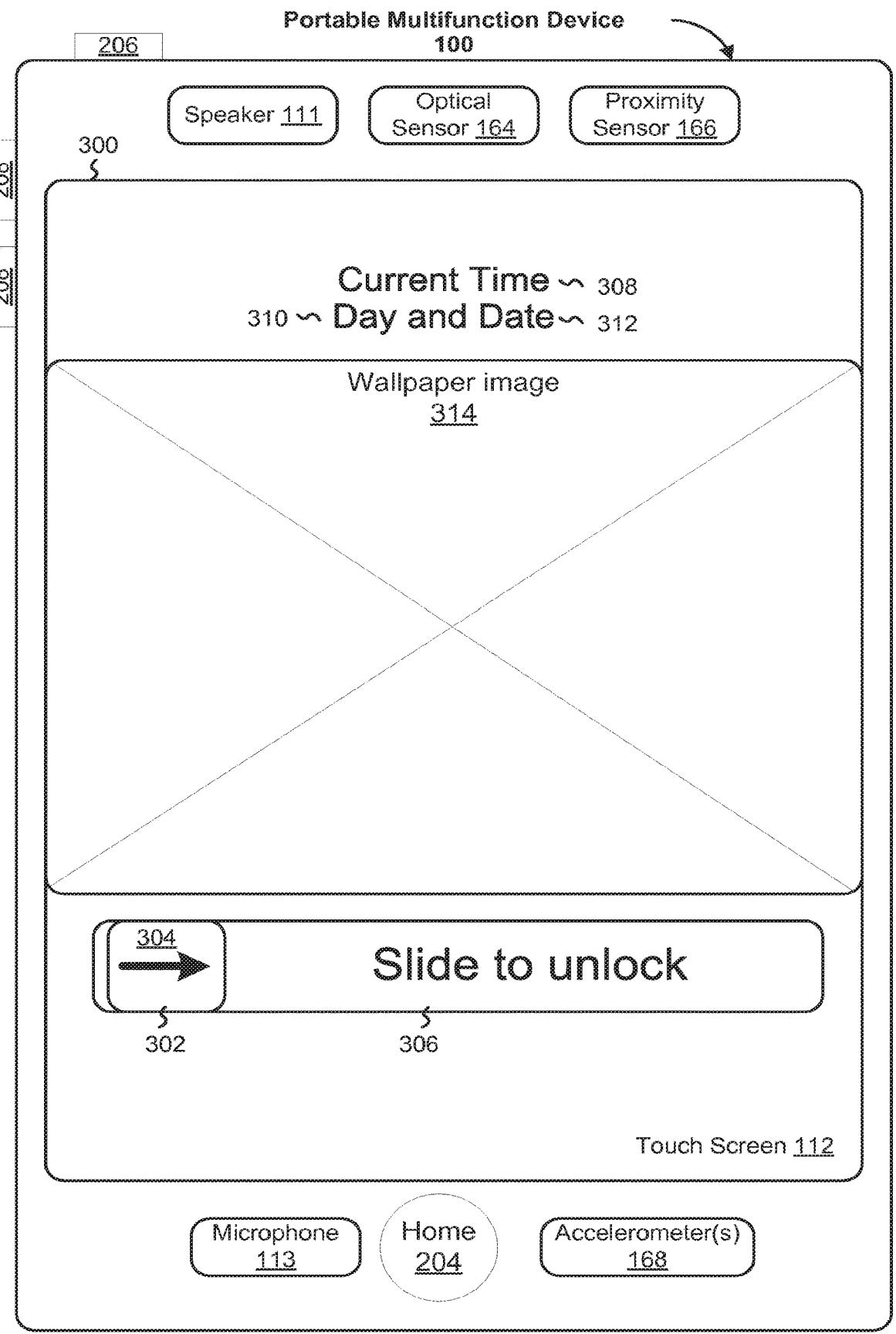
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
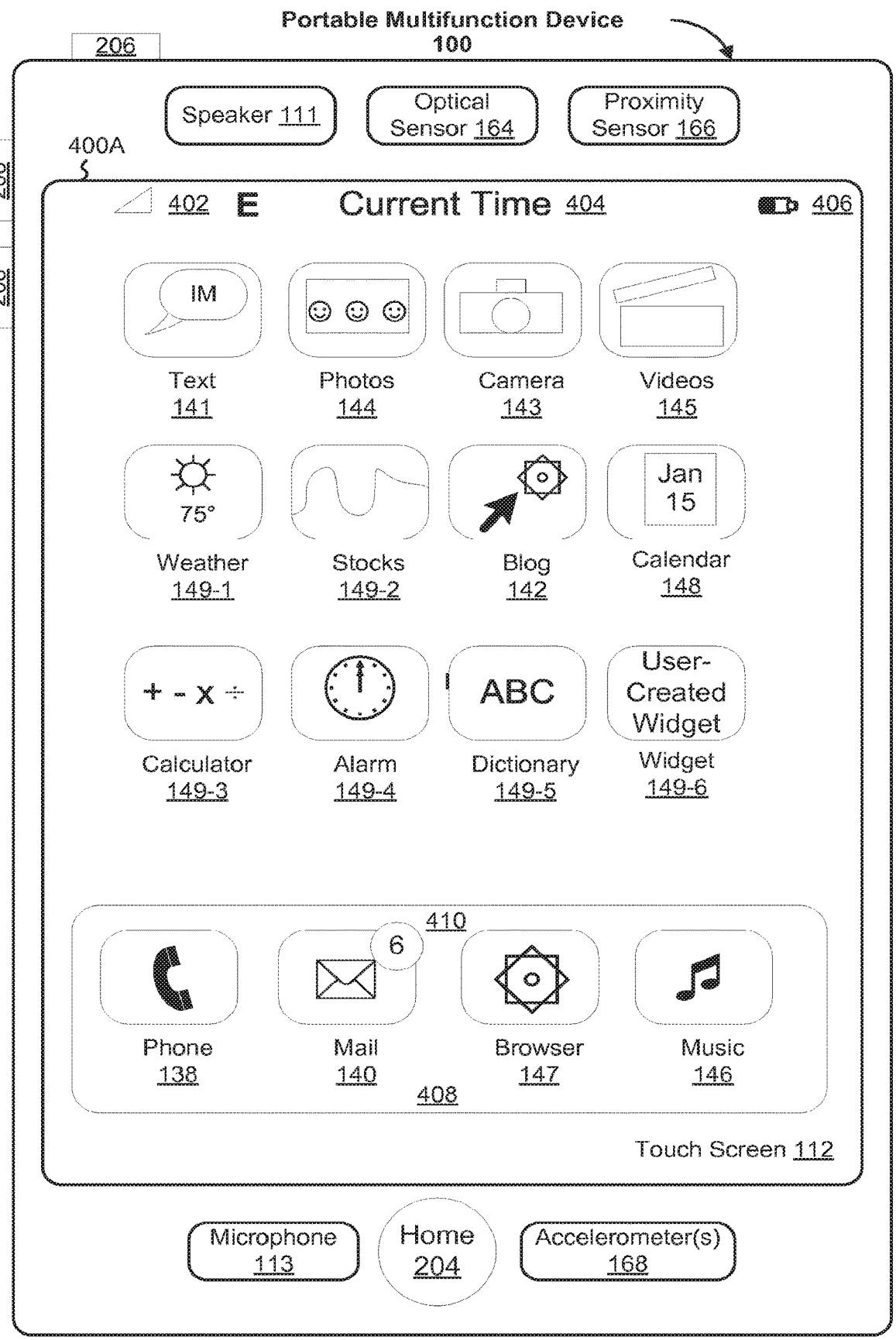
FIGS. 4A and 4B illustrate exemplary user interfaces for a menu of applications on a portable multifunction device in accordance with some embodiments.
Figure 4B:
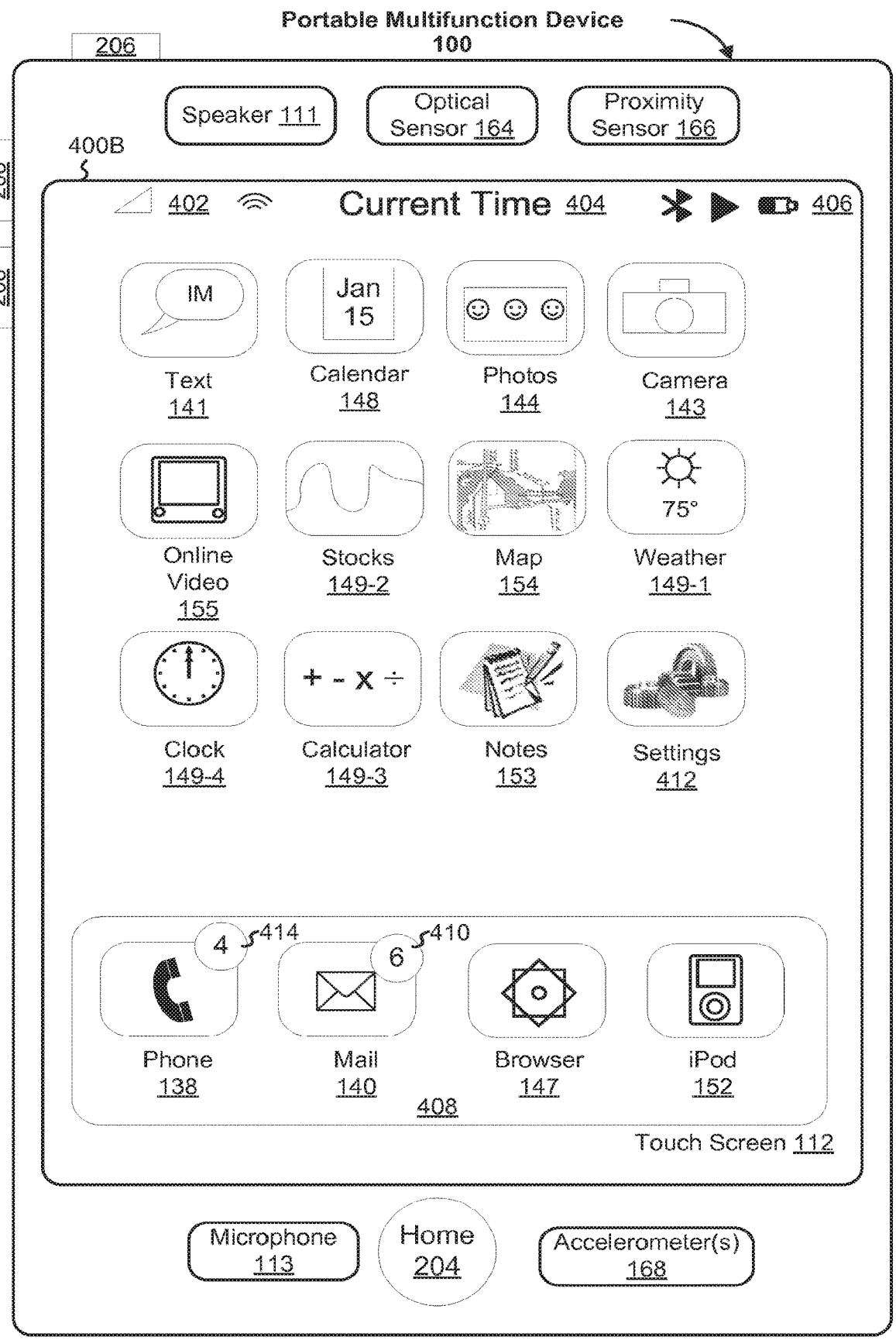

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as:

Phone 138, which may include an indicator 414 of the number of missed calls or voicemail messages;

E-mail client 140, which may include an indicator 410 of the number of unread e-mails;

Browser 147; and

Music player 146; and

Icons for other applications, such as:

IM 141;

Image management 144;

Camera 143;

Video player 145;

Weather 149-1;

Stocks 149-2;

Blog 142;

Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 406, 141, 148, 144, 143, 149-3, 149-2, 149-1, 149-4, 410, 414, 138, 140, and 147, as described above;

Map 154;

Notes 153;

Settings 412, which provides access to settings for the device 100 and its various applications 136, as described further below;

Video and music player module 152, also referred to as iPod (trademark of Apple Computer, Inc.) module 152; and Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Managing Multiple Email Accounts

Figure 5A:
FIGS. 5A-5C illustrate an exemplary user interface for organizing and managing email from multiple accounts in accordance with some embodiments.
Figure 5B:
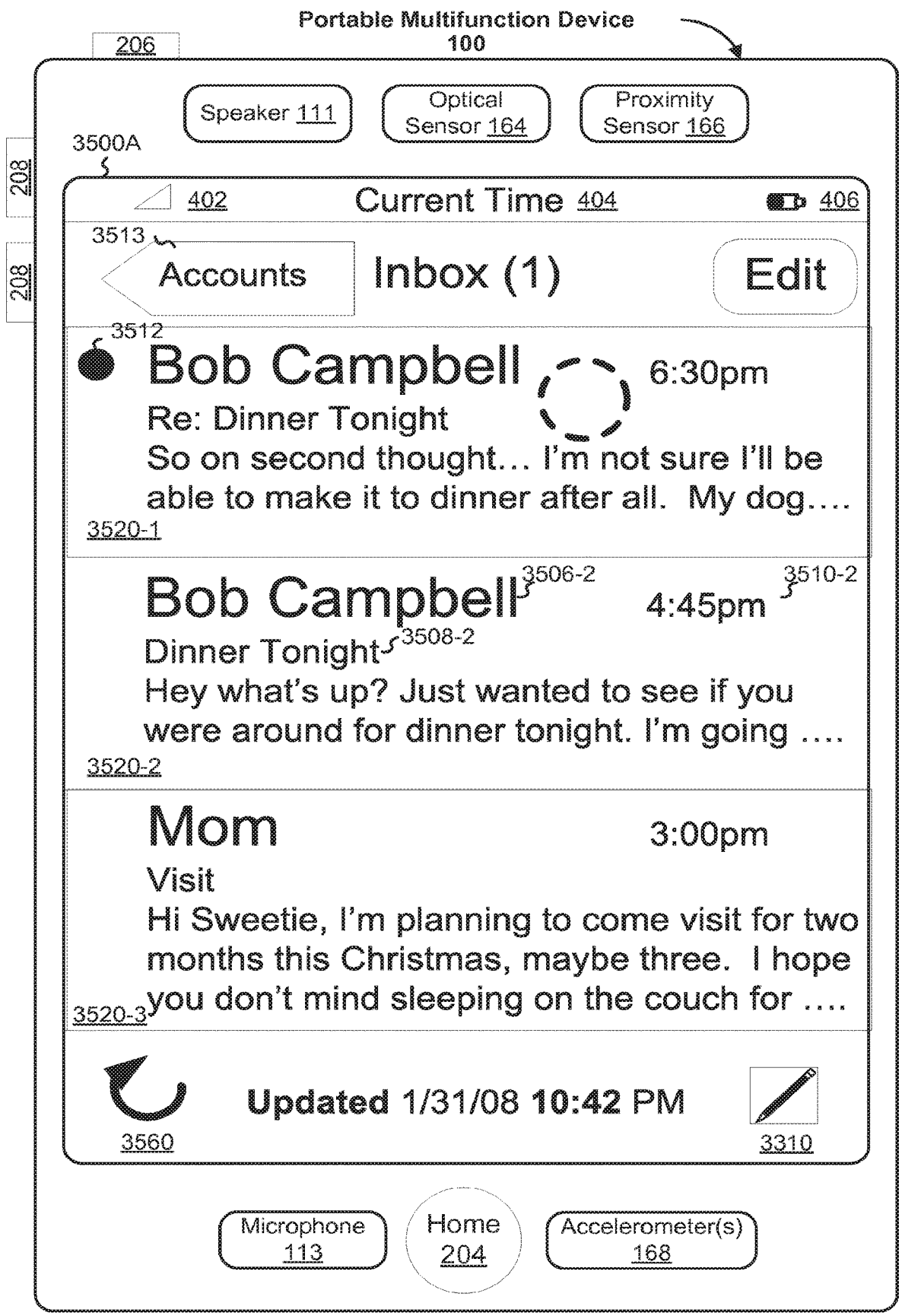
Figure 5C:
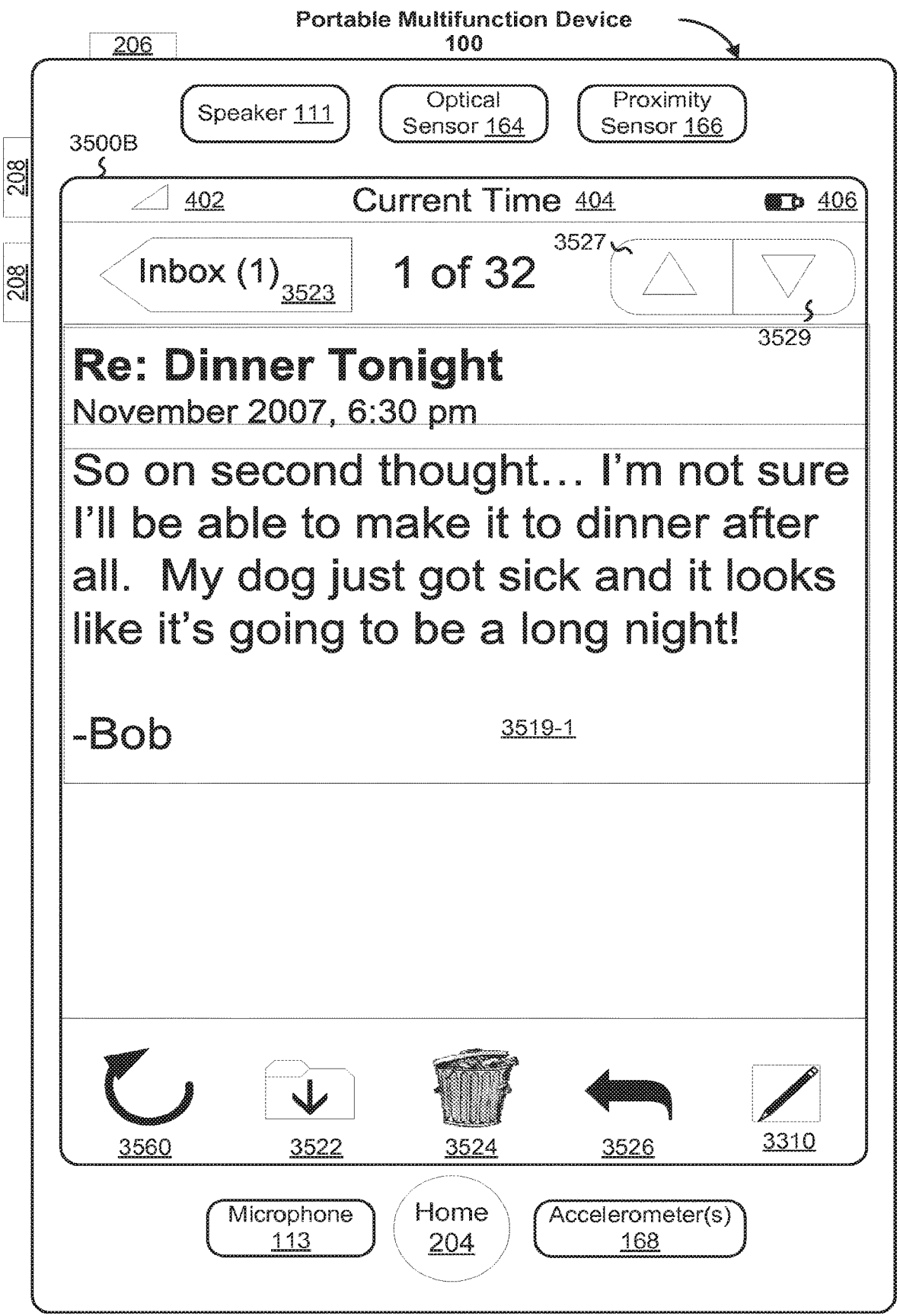

FIGS. 5A-5C illustrate exemplary user interfaces, including an Accounts user interface 3300A, for organizing and managing multiple email accounts in accordance with some embodiments. The Accounts UI 3300A shown in FIG. 5A can be displayed by the email client module/application 140. In some embodiments, the user interface 3300A includes the following elements, or a subset or superset thereof:

Elements 402, 404, and 406, as described above.

An "All Accounts" descriptor 3316. When the "All Accounts" descriptor 3316 is selected by the user, a user interface such as 3600A or 3600B (described below with reference to FIGS. 7A-7B) is displayed that includes information for emails from two or more of the user's email inboxes (in what is referred to as a Unified Inbox).

A set of email account descriptors 3318-i, such as sgold@z.com 3318-1, which may be organized in rows, and which may include unread email indicators 3308-i that show the number of unread emails for each email account. In this example, there are three account descriptors: sgold@z.com 3318-1, sgold@mac.com 3318-2, and sgold@gmail.com 3318-3. When any of these account descriptors is selected by the user, an Inbox UI 3500A (described below in reference to FIG. 5B) is displayed that includes information for emails from the associated Inbox.

Referring to FIG. 5A, if the list of accounts fills more than the screen area, the user may scroll through the accounts using vertically upward and/or vertically downward gestures 3314 on the touch screen. As shown in FIG. 5A, the user has tapped on the sgold@gmail.com account descriptor, which has one unread email. The result of this user action is described in reference to FIG. 5B.

Referring to FIG. 5B, in response to the user selecting the account, sgold@gmail.com, an email UI 3500A displays descriptors 3520 for at least a portion of the emails from the Inbox for that account (i.e., this is not a collection of mailbox folders from which the Inbox would need to be selected in an additional step). The Inbox includes a descriptor 3520-1 for one unread email, which is indicated in this embodiment with a filled-in dot 3512. In some embodiments, a user can view a list of all of the inboxes for different email accounts associated with the user (e.g., the user's accounts at Z.com (the user's email account at work), mac.com, and gmail-.com.) by selecting the "Accounts" icon 3513 shown in the heading of the UI 3500A. In some embodiments, information displayed for emails in this UI 3500A includes: sender 3506, subject 3508 and date sent (or received) 3510. The user can update the contents of the Inbox or compose a new email by selecting the update and compose icons 3560, 3310, respectively. An advantage of this method of operation is that it allows a user to view contents of a different Inbox on the UI 3500 in only two steps (e.g., one finger tap to access the Accounts view and a second finger tap to initiate display of the Inbox associated with a different email account). As shown in FIG. 5B, the user has tapped/selected an unread email 3520-1 from Bob Campbell related to "Dinner Tonight." The result of this selection is described in reference to FIG. 5C.

FIG. 5C shows the UI 3500B as it displays the email 3519-1 (FIG. 5B) selected by the user for display. The email when displayed includes subject and date information and the complete text of the email. The tray at the bottom of the UI 3500 includes:

- an Update icon 3560;
- a Folders icon 3522 that, when activated, initiates display of a set of email folders into which the user can move the email 3520;
- a Trash Can icon 3524 that, when activated, initiates display of a UI for deleting the email; and
- a Reply/Forward icon 3526 that when activated (e.g., by a finger tap on the icon) initiates display of a UI that enables the user to select how to reply or forward the selected email.

From this display, the user can return to the Inbox using the back icon 3523 or can navigate to the previous or next email in the Inbox using the up and down arrow icons 3527, 3529.

Email with Embedded Photos

Figure 6A:
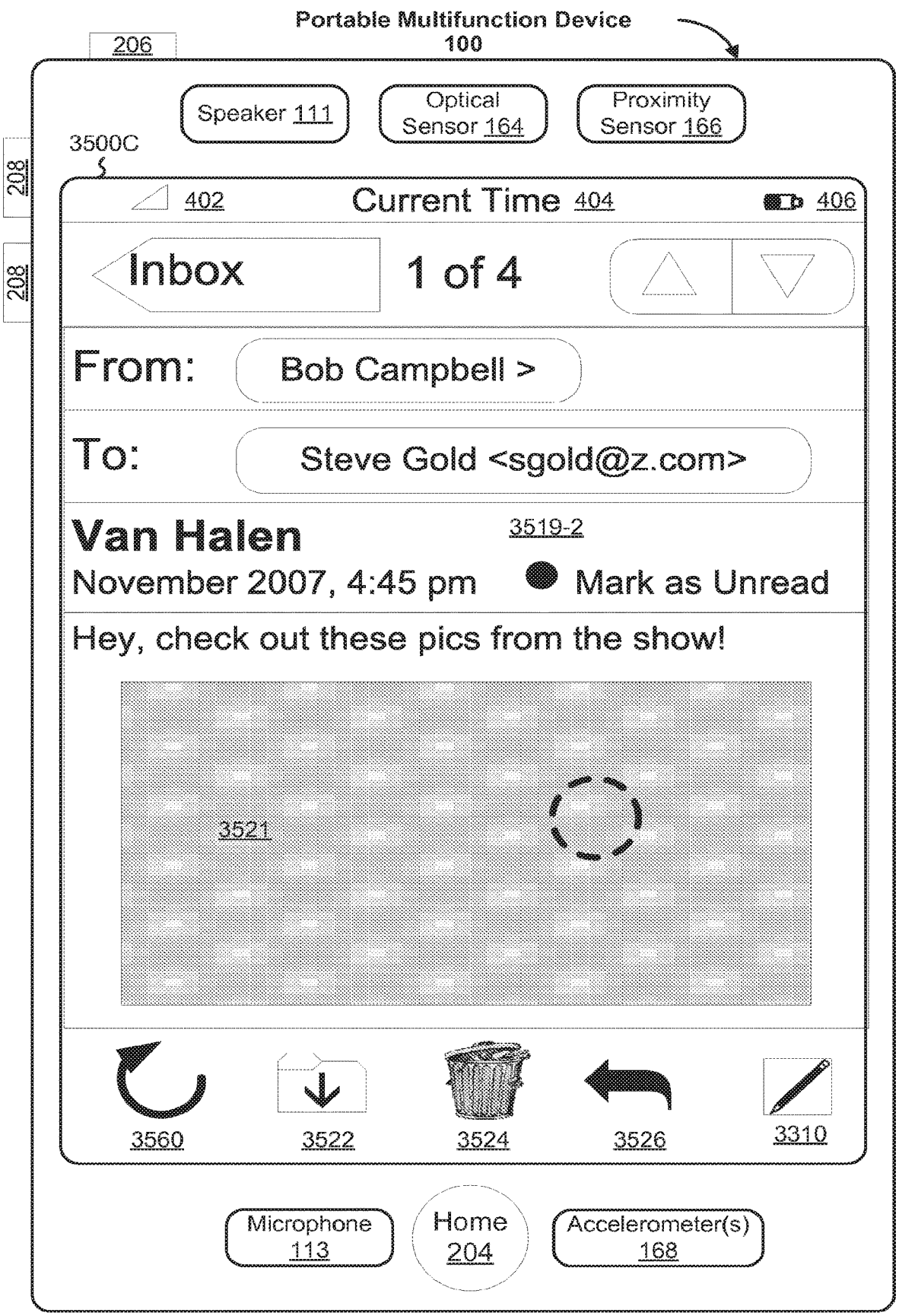
FIGS. 6A-6C illustrate an exemplary user interface for managing and accessing photos that are embedded in emails in accordance with some embodiments.

FIGS. 6A-6E illustrate an exemplary user interface for managing and accessing photos that are embedded in emails in accordance with some embodiments. Referring to FIG. 6A, there is shown an Inbox UI 3500C with elements that are similar to those already described with reference to FIG. 5B. In particular, the UI 3500C shows an expanded view of an email 3520-6 related to the subject, "Van Halen." In addition to the standard "From" and "To" information, the email 3520-6 includes embedded graphics 3521-6 (e.g., one or more digital photos) which the user has selected (e.g., tapped) to request further interaction therewith (e.g., via FIG. 6B).

Figure 6B:
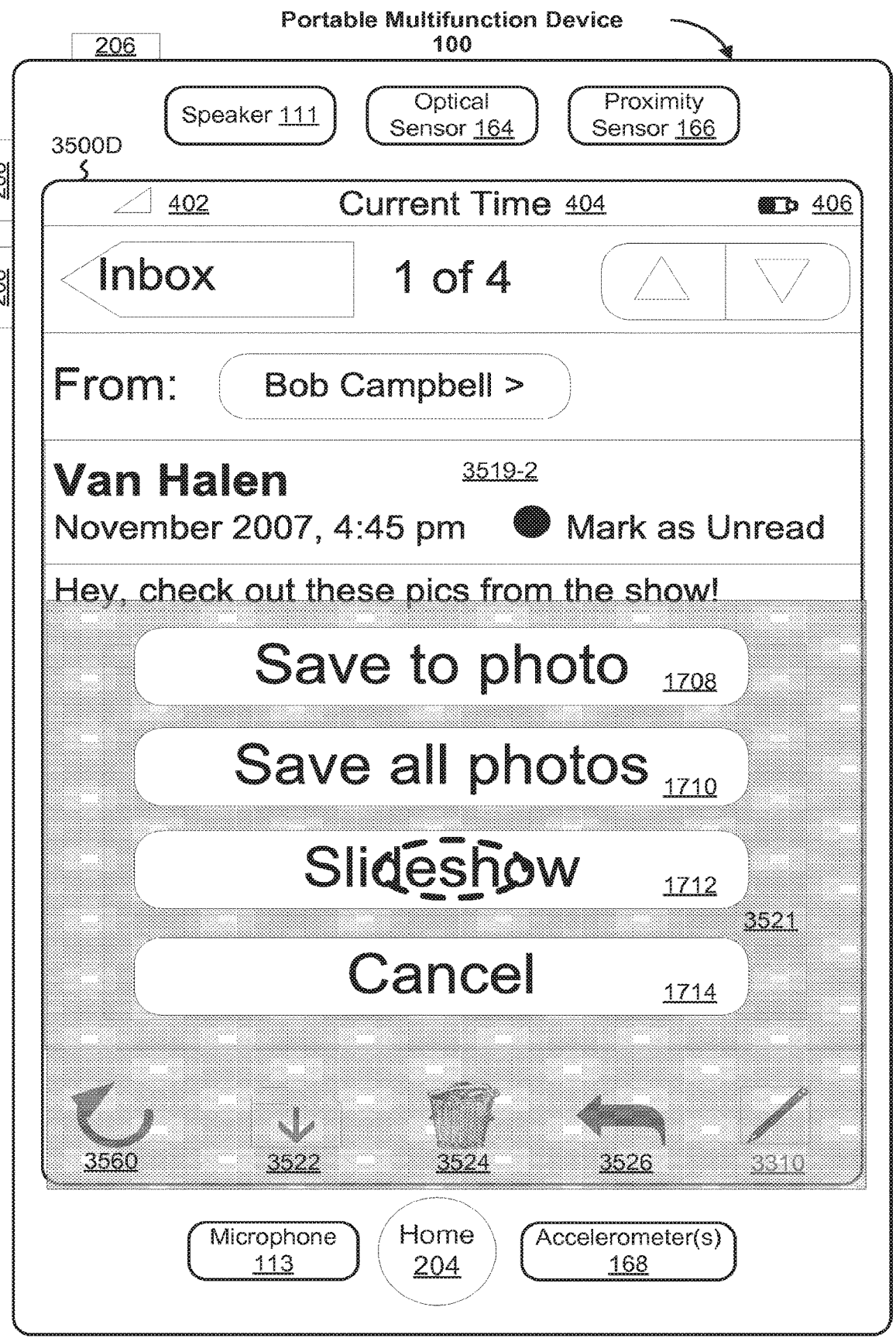

FIG. 6B illustrates a UI 3500D that, in response to selection by the user of the embedded graphics 3521 (FIG. 6A), displays a number of options for interacting with the embedded graphics 3521 in accordance with some embodiments. These options may include: "Save to photo" 1708. "Save all photos" 1710, "Slideshow" 1712 and "Cancel" 1714. Different embodiments may provide a subset or superset of these options. Note that in some embodiments these options are only provided by the device 100 when the selected content (such as an embedded graphic 3521) is of a predetermined, appropriate type. In some embodiments, such appropriate files have an extension or type that is characteristic of digital photographs, such as ".JPG" for JPEG files. In these and similar embodiments, selection of embedded files of other types, such as HTML web pages or a small GIF icon files, will not initiate display of these photo interaction options 1708-1714.

Figure 6C:
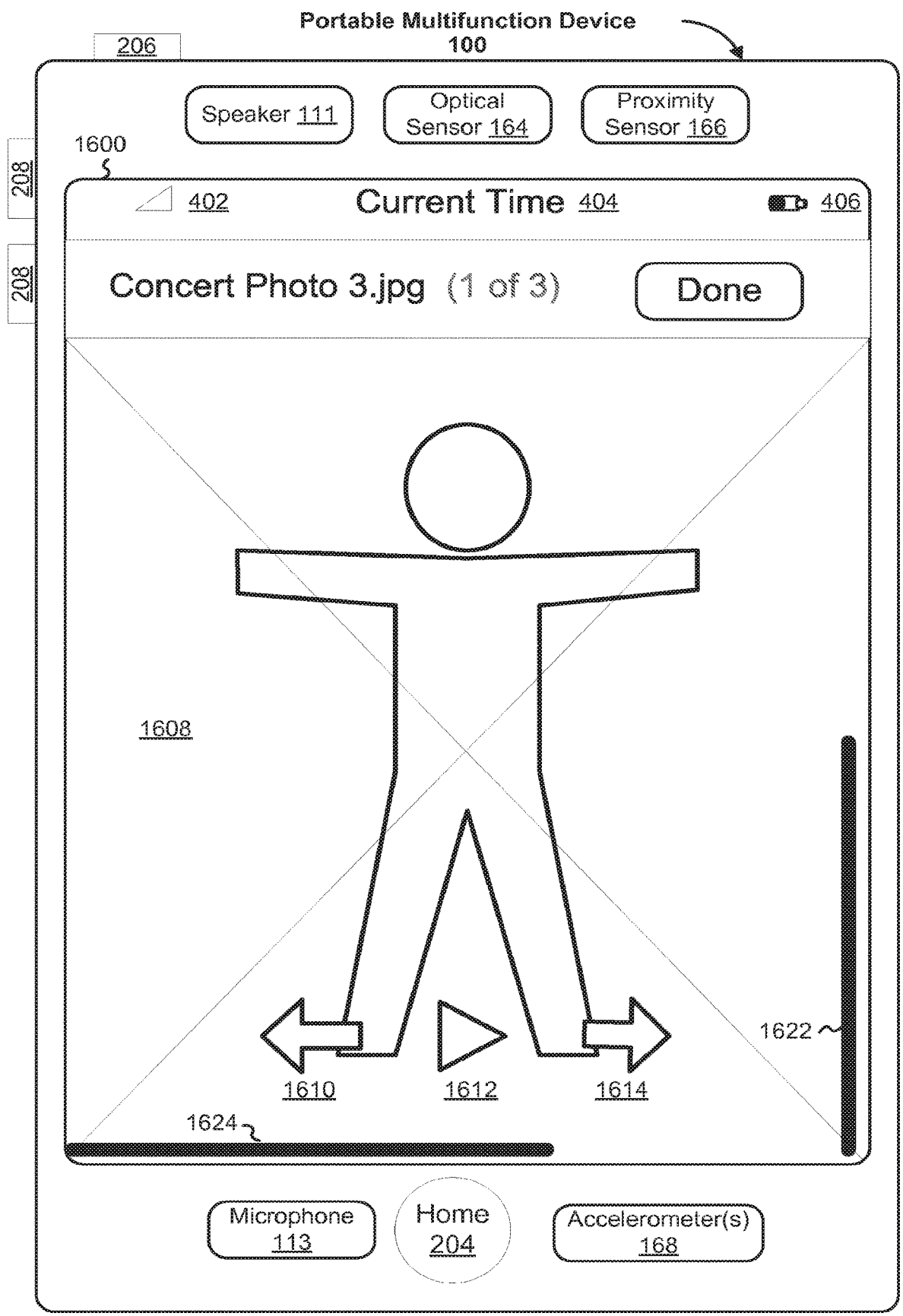

In some embodiments, the illustrated options have the following effect:

- The "Save to photo" option 1708 causes a selected, embedded photo in an email to be saved to the device 100;
- The "Save all photos" option 1710 causes all embedded photos in an email to be saved to the device 100;
- The "Slideshow" option 1712 causes a slideshow to be initiated and shown on the device 100 using the embedded photos in an email—this option is selected in FIG. 6B, with a result that is described in reference to FIG. 6C;
- The "Cancel" option 1714 causes the UI 3500D to close and UI 3500C to return (FIG. 6A).

FIG. 6C illustrates a UI 1600 in which a slide show is displayed using information and images from the embedded graphics 6521 in accordance with some embodiments. This UI displays an expanded view 1608 of each image in the embedded graphics 6521. In some embodiments, Navigation icons are overlaid on the displayed image 1608. These navigation icons can be selected by a user to move forward 1614 or backward 1610 in the slideshow, or to simply play the slideshow 1612. The slideshow UI 1600 also includes vertical and horizontal bars 1622, 1624 that indicate to a user the portion of the image 1608 being displayed. In some embodiments, if there is only one image in the embedded graphics 3521, the user may not be given the slideshow option 1712 to initiate a slide showshow from the UI 3500D (FIG. 6B).

Unified Inboxes

Figure 7A:
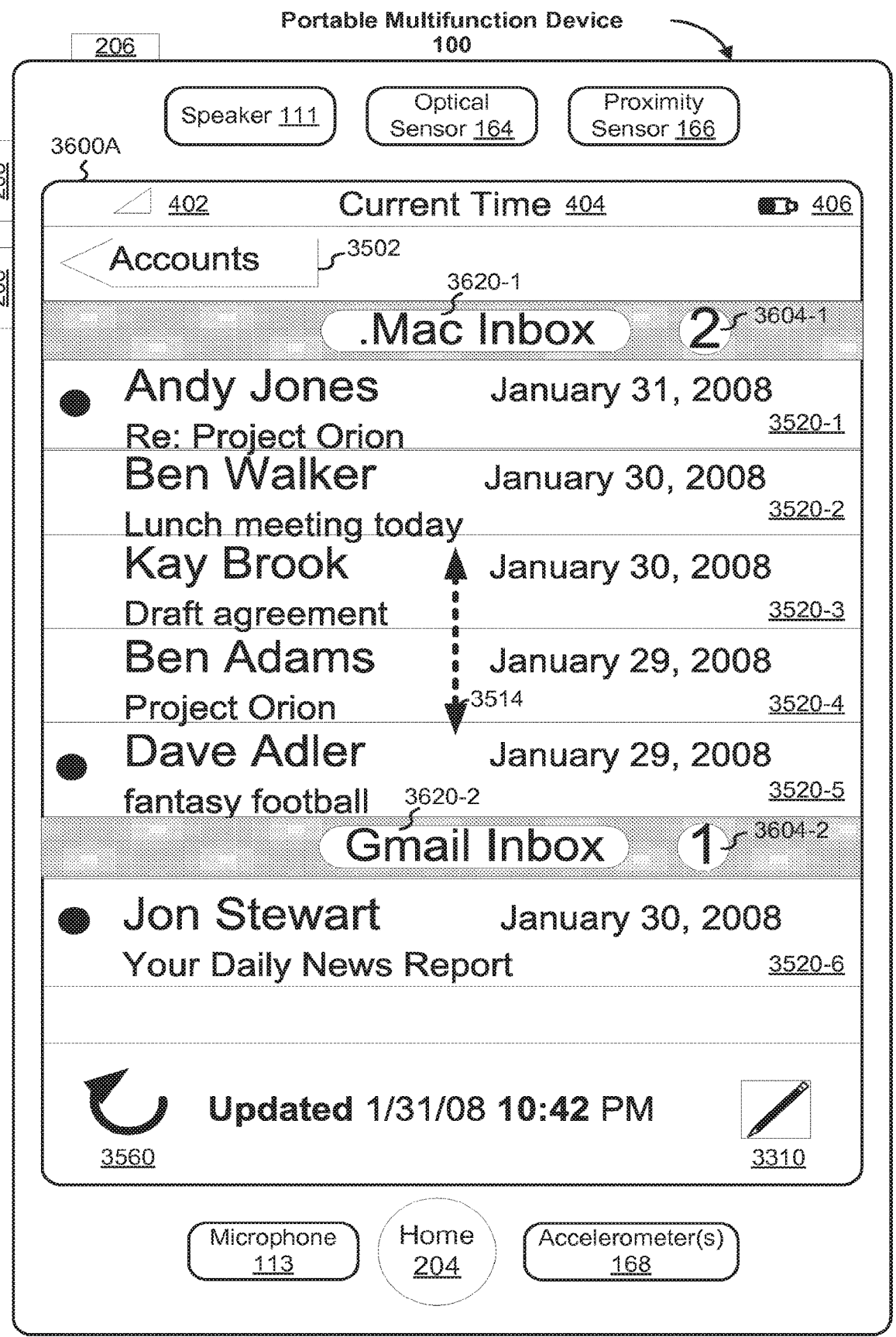
FIGS. 7A-7B illustrate exemplary user interfaces for managing emails associated with multiple email accounts.
Figure 7B:
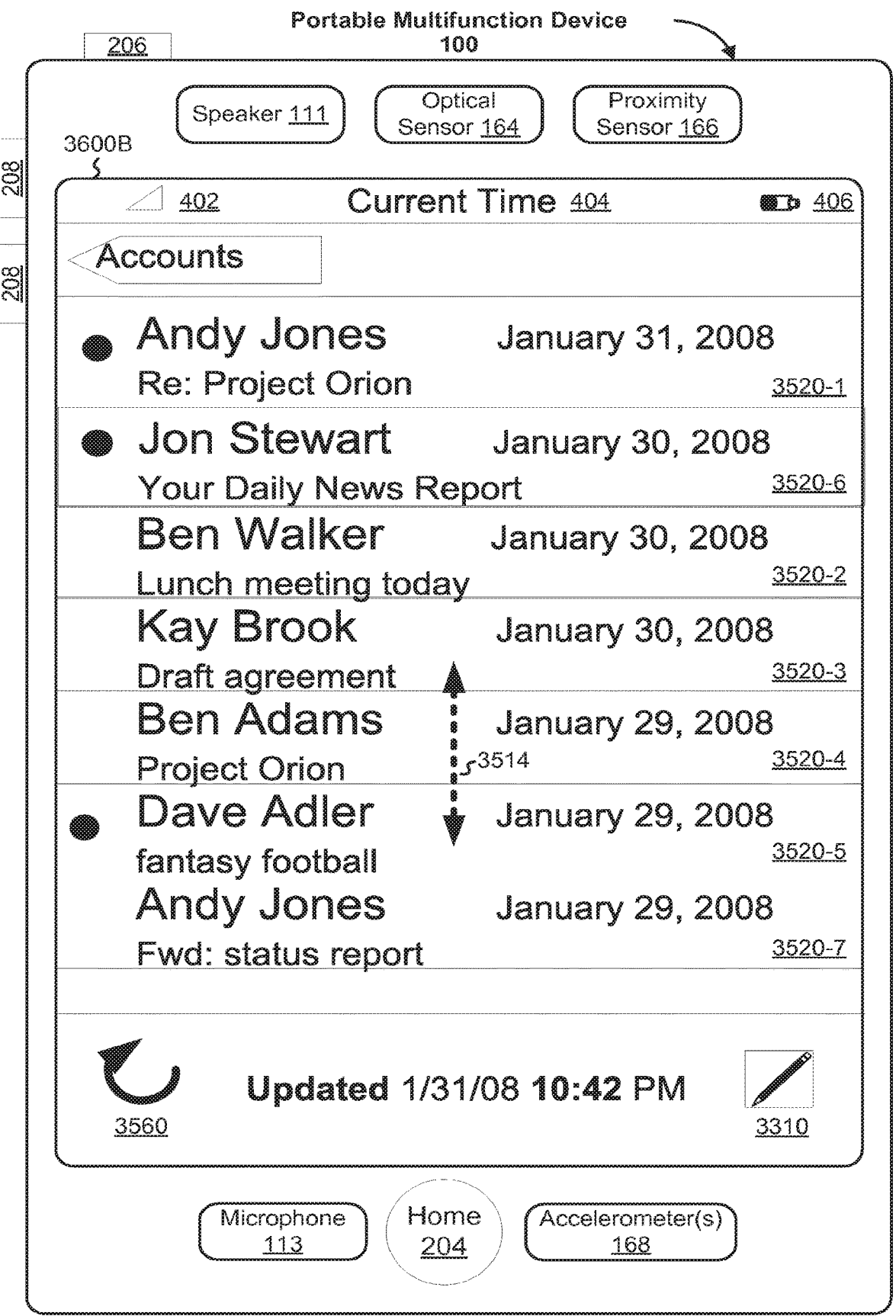

FIGS. 7A-7B illustrate exemplary user interfaces 3600A and 3600B for simultaneously displaying and managing one or more Inboxes of an email client 140 in accordance with some embodiments. An analogous user interface may be used to display and manage the other mailboxes (e.g., drafts, sent, trash, personal, and/or work).

Some embodiments are directed to providing a unified inbox from which emails from multiple email accounts can be accessed from a common user interface screen 3600. In some embodiments, the unified inbox view can be accessed using a single icon (e.g., an "All Accounts" icon 3316, FIG. 5A). Mail from all available accounts (or, optionally, a selected subset of the accounts) is shown when the "All Accounts" icon 3316 is selected. In some embodiments, emails from the multiple accounts are interleaved by time and date (FIG. 7B). They can also be sorted by sender or other criteria. The emails can also be color-coded based on the account from which they originate. In other embodiments, the emails associated with a particular account can be shown in separate portions of a scrollable display (FIG. 7A).

In particular, FIG. 7A illustrates a UI 3600A for an embodiment where emails associated with two or more Inboxes are shown in separate sections/panes of the UI 3600A. For example, in FIG. 7A, emails from the user's Mac Inbox 3620-1 and emails from the user's Gmail Inbox 3620-2 are shown in separate sections of the UI 3600A.

FIG. 7B shows a different exemplary embodiment of a UI 3600B, where the emails from two or more inboxes are interleaved according to one or more predetermined sorting criteria. For example, in FIG. 7B, the emails from the users .Mac and Gmail inboxes are interleaved according to email date 3510. In different embodiments, different sorting criteria can be employed, including any combination of date, subject, sender, message size, and/or message priority, all of which can be arranged in ascending or descending order.

In some embodiments, the user interfaces 3600A and 3600B include the following elements, or a subset or superset thereof:

- Elements 402, 404, 406, 3310 and 3560 as described above.
- An "Accounts" icon 3502 that, when activated (e.g., by a finger tap on the icon), initiates the display of an Accounts UI 3300A (FIG. 5A) that lists email accounts available to the user of the device 100.
- Inbox descriptors 3620-i (FIG. 7A only), each of which identifies one of the multiple Inboxes associated with the UI 3600. In the exemplary UI shown in FIG. 7A, the inboxes for which information is displayed on the UI 3600A include a .Mac inbox 3560-1 and a Gmail inbox 3620-2.
- An Inbox status icon 3604-i that displays the number of unread messages in each displayed Inbox. As shown in FIG. 7A, the .Mac inbox has 2 unread emails 3604-1 and the Gmail inbox has 1 unread email 3604-2.

Email descriptors 3520-*i*, each of which may include for a particular email its sender 3506-*i*, subject 3508-*i* and date sent (or received) 3510-*i*. An email descriptor 3520-*i* that is associated with an unread email also can include an unread email icon 3512, which, in the illustrated embodiment, is shown as a filled-in dot.

If the set of emails fills more than the screen area, the user may scroll through the emails using vertically upward and/or vertically downward gestures 3514 on the touch screen. A user can view the contents of any email that is listed in one of the inboxes 3620 by selecting (e.g., tapping with a finger) the corresponding email descriptor 3520-*i*. Thus, a user of the portable device 100 benefits by being able to view and access information and contents from emails from multiple email accounts from one UI 3600A.

In some embodiments, in response to a tap or other predefined gesture by the user on an email descriptor 3520 for a particular email message, some or all of the text in the row is highlighted (e.g., by coloring, shading, or bolding) and the corresponding message is displayed in a preview pane area (not shown in FIG. 7A). Additional information about the preview pane is described in the related applications set out above and incorporated by reference herein. In some embodiments, in response to a tap or other predefined gesture by the user on an email descriptor 3520 for a particular email message, that email message is displayed on the full screen if a preview pane is not being used.

The embodiment of the UI 3600B shown in FIG. 7B uses the same basic elements, and has the advantages described above with reference to FIG. 7A, the main difference being that the embodiment 3600B does not include elements related to the display of information 3620, 3604 for separate inboxes/panes.

Access to Different Email Accounts Via a Pane Curl Effect

Figure 7C:
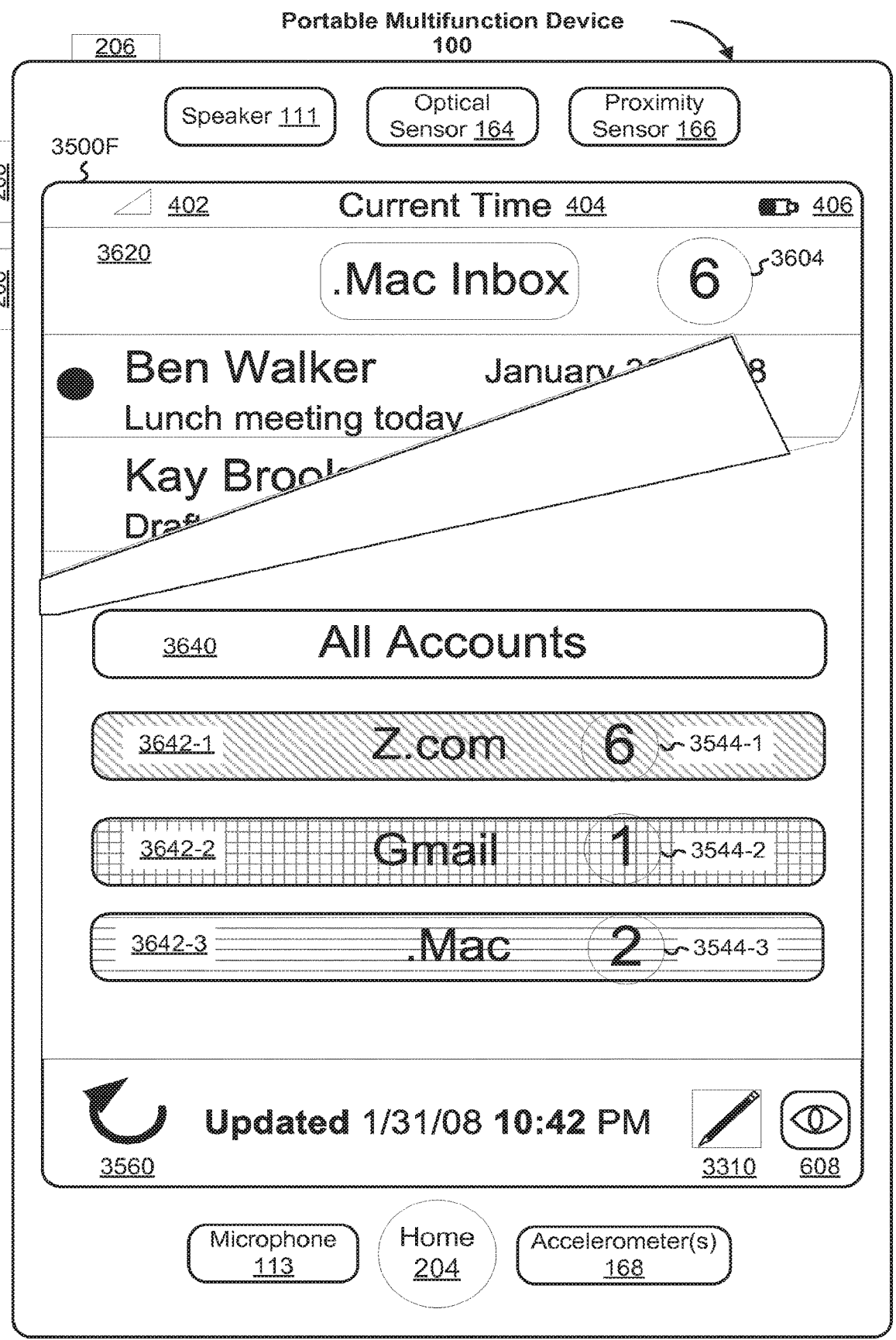
FIG. 7C illustrates an exemplary user interface for providing quick, unified inbox access to emails associated with one or many email accounts.

FIG. 7C illustrates a different embodiment of a UI 3500F that allows a user of a first inbox to access a second inbox in two steps (e.g., two clicks, taps, or other user gestures/UI interactions). The elements of FIG. 7C are similar to those described in reference to FIG. 7A. In particular, the UI 3500F of FIG. 7C may include:

A heading 3620 that shows the name of the current mailbox (e.g., ".Mac Inbox") and the number of unread email messages in that mailbox 3604.

A view options icon 608 that, when activated (e.g., by a user tap on the icon), initiates a "page curl" effect in which the email listing on the UI 3500F appears to bend, fold, or otherwise curl up to reveal a list of email account descriptors 3642 and an "All Accounts" icon 3640, while at the same time concealing some or all of the email descriptors a previously shown on the UI 3500F.

In some embodiments, an email account descriptor 3642 also includes, where applicable, an indicator 3544 that shows the number of unread emails in the Inbox associated with that account. In response to detecting a gesture (e.g., a finger tap gesture) on one of the email account descriptors 3642 or the all accounts icon 3640, the device displays (or redisplays) the corresponding Inbox via a "page uncurling" effect.

In some embodiments, the view options icon 608 can show using color the status of other email accounts (e.g., the dot in the center of the eye might be colored red to show a high level of unread mail in other accounts, or additional icons/signals (such as exclamation marks, etc.) can be layered over the "eye" icon to show other mail status information.

As described above, an advantage of this method is that a user can switch from a first inbox associated with one account to a second inbox associated with a different account in just two finger taps/operations. This convenience is beneficial in a portable, multifunction device with limited display and user input space.

Account and Inbox Switching

Figure 8A:
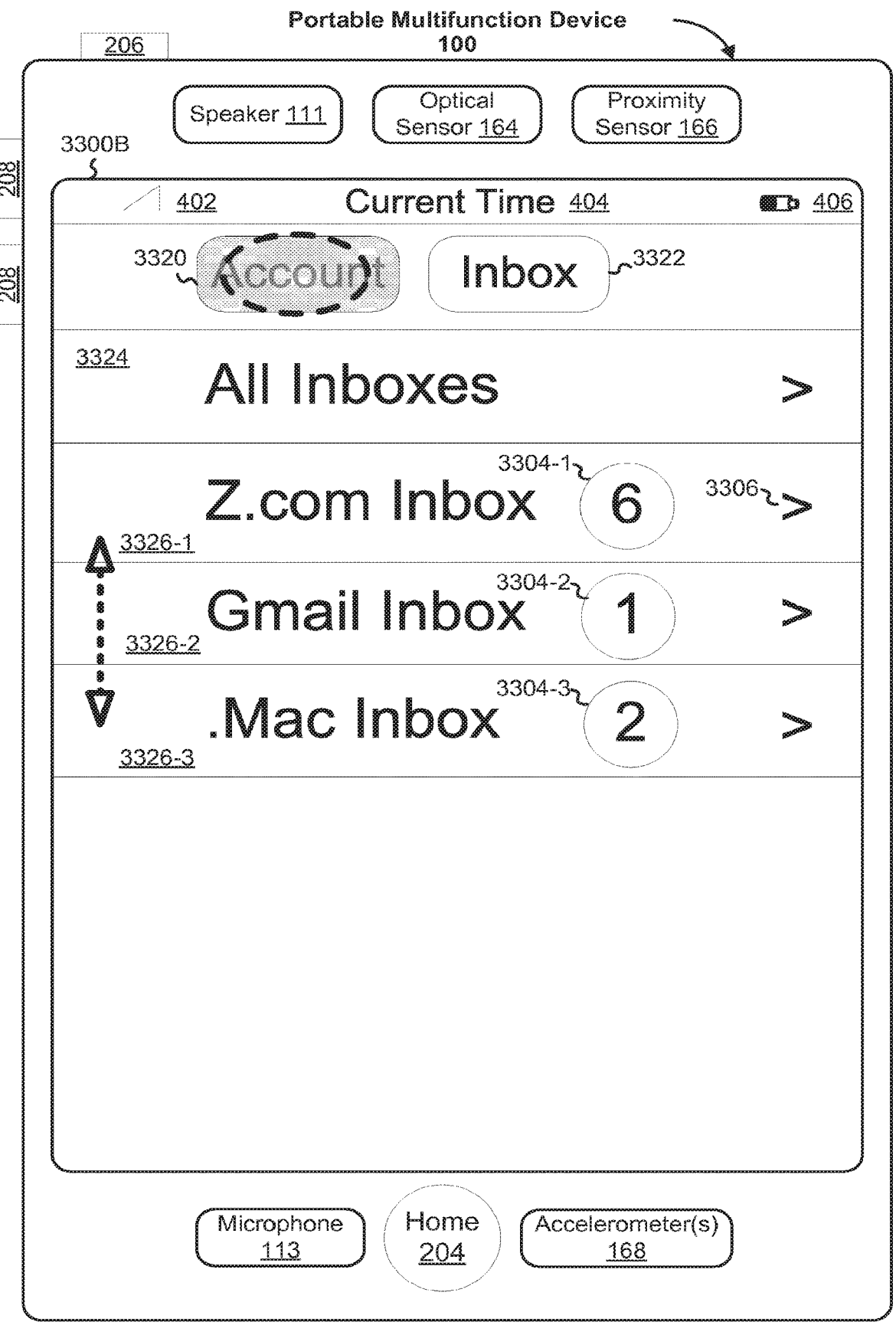
FIG. 8A-8C illustrate exemplary user interfaces for switching between different views of email accounts and inboxes available on a portable multifunction device.
Figure 8B:
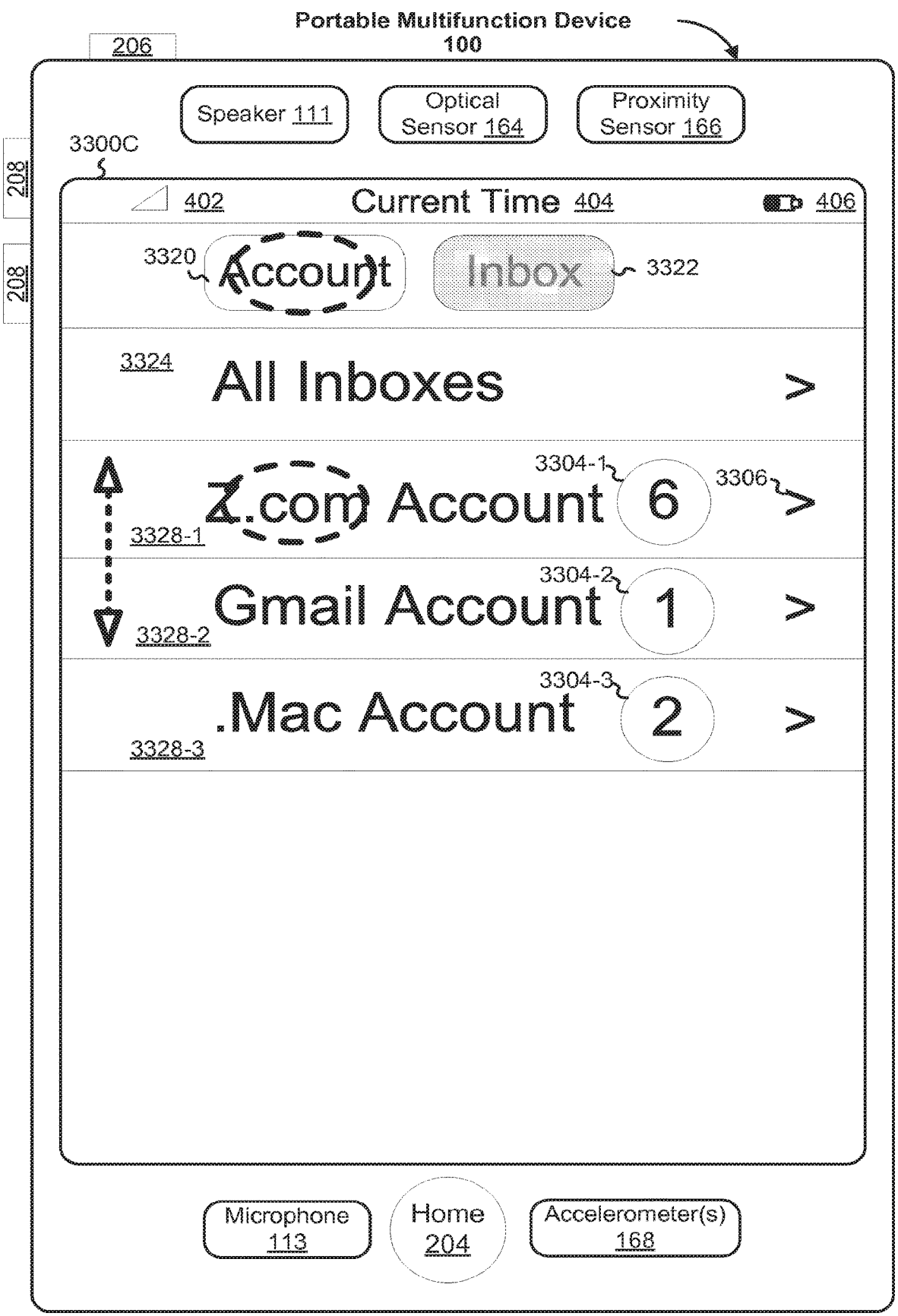
Figure 8C:
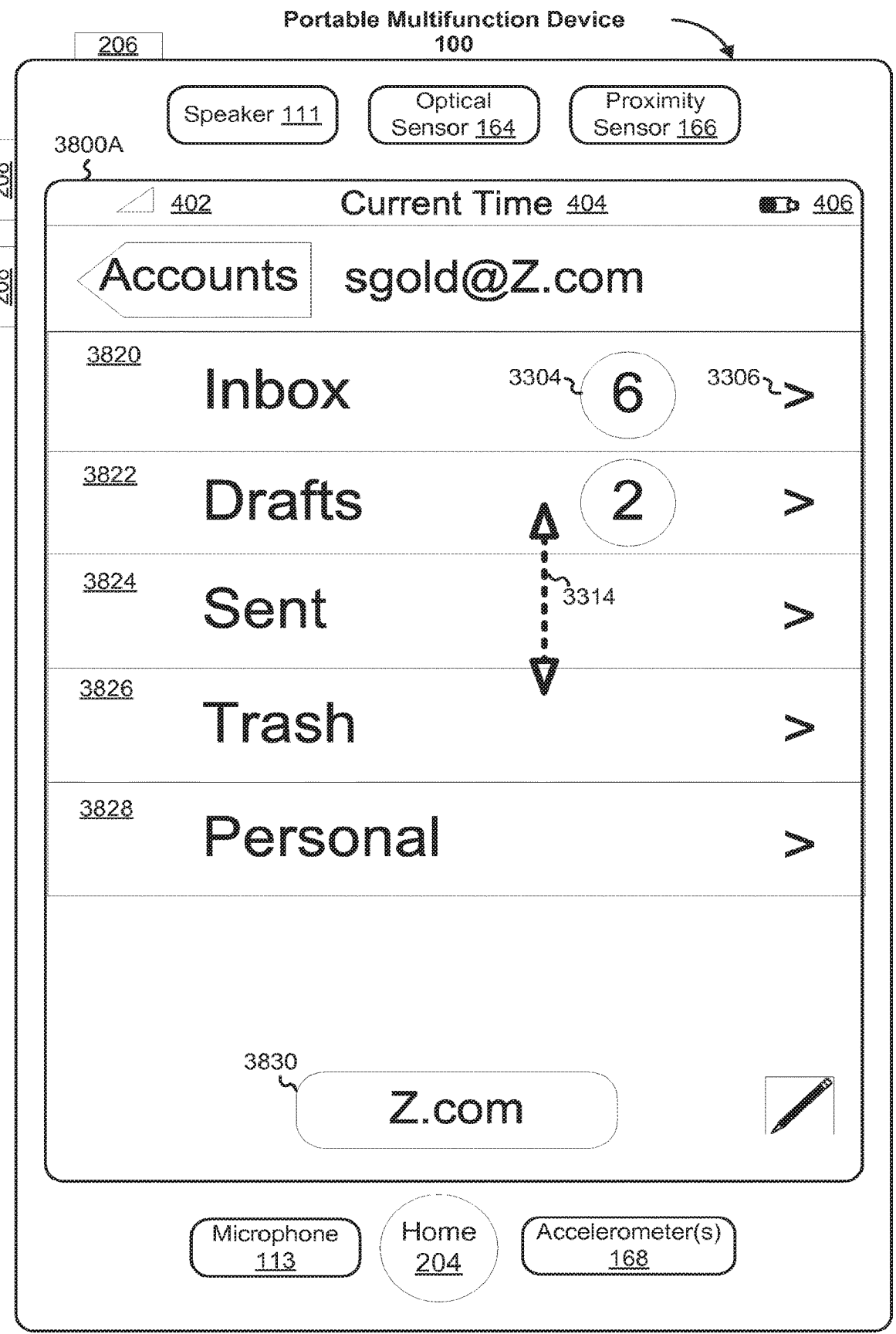

FIGS. 8A-8C illustrate exemplary user interfaces 3300 for displaying and managing (and switching between) one or more inboxes and/or email accounts of an email client 140 in accordance with some embodiments. In particular, these user interfaces provide a user with the ability to manage all of their inboxes and/or accounts in an intuitive manner. In some embodiments, the user interfaces 3300B and 3300C include the following elements, or a subset or superset thereof:

Elements 402, 404, 406, as described above.

An Account icon 3320, which, when activated, initiates display of an Account View UI 3300C in which information is displayed for the user's email accounts, as shown in FIG. 5B.

An Inbox icon 3322, which, when activated, initiates display of an Inbox View UI 3300B in which information is displayed for the user's email inboxes, as shown in FIG. 8A.

An All Inboxes icon 3324 that, when activated (e.g., by a finger tap on the icon), initiates the display of an All Inboxes UI (e.g., UI 3600A, FIG. 7A, or UI 3600B, FIG. 7B) in which email descriptors are displayed for all inboxes for respective user email accounts.

Additional Information icons (e.g., ">") 3306, the activation of which may initiate display by the touch screen of additional information for the associated entry on the UI 3300 (e.g., in FIG. 8A, initiating display of emails in an inbox or, in FIG. 8B, initiating display of mailboxes for a selected account).

Referring to FIG. 5A, there is shown an Inbox view of the UI 3300B that displays a collection of inbox descriptors 3326-*i* associated with the user's email accounts. For example, the inboxes descriptors 3326-*i* correspond to a Z.com Inbox 3326-1, a Gmail Inbox 3326-2, and a .Mac Inbox 3326-3, each of which is associated with a different respective email account. Each inbox descriptor 3326 also includes a number 3304 of unread emails in the respective inbox and an additional information icon (e.g., ">") 3306, which is described above. In FIG. 8A, the user has selected the Account icon 3320, which initiates display (shown in FIG. 8B) of an Account view of the users email accounts.

Referring to FIG. 8B, there is shown an Account view, UI 3300C, that displays a collection of the user's email accounts. For example, the listed accounts include a Z.com Account 3328-1, a Gmail Account 3328-2, and a .Mac Account 3328-3. From this window the user can select one of the listed accounts, in response to which the UI 3300 will display detailed information, such as a list of all folders, associated with the selected account. As shown in FIG. 8B, the user has selected for further display the Z.com Account 3340, the result of which is described with reference to FIG. 8C.

FIG. 8C shows an exemplary view of a UI 3800A that is displayed in response to the user's selection of the Z.com Account listing 3328-1 (FIG. 8B). This view shows all mailboxes/folders associated with the selected account, which can include a subset or superset of the following mailboxes/folders: Inbox 3820, Drafts 3822, Sent 3824, Trash 3826 and Personal 3828. Each of the mailboxes/folders 3820-3828 can also include an indicator 3304 that shows the number of unread or unsent emails associated with that particular mailbox/folder. This view may also include an icon 3830 (e.g., Z.com) that indicates the email account associated with the currently displayed account information.

Management of Account Settings

Figure 9A:
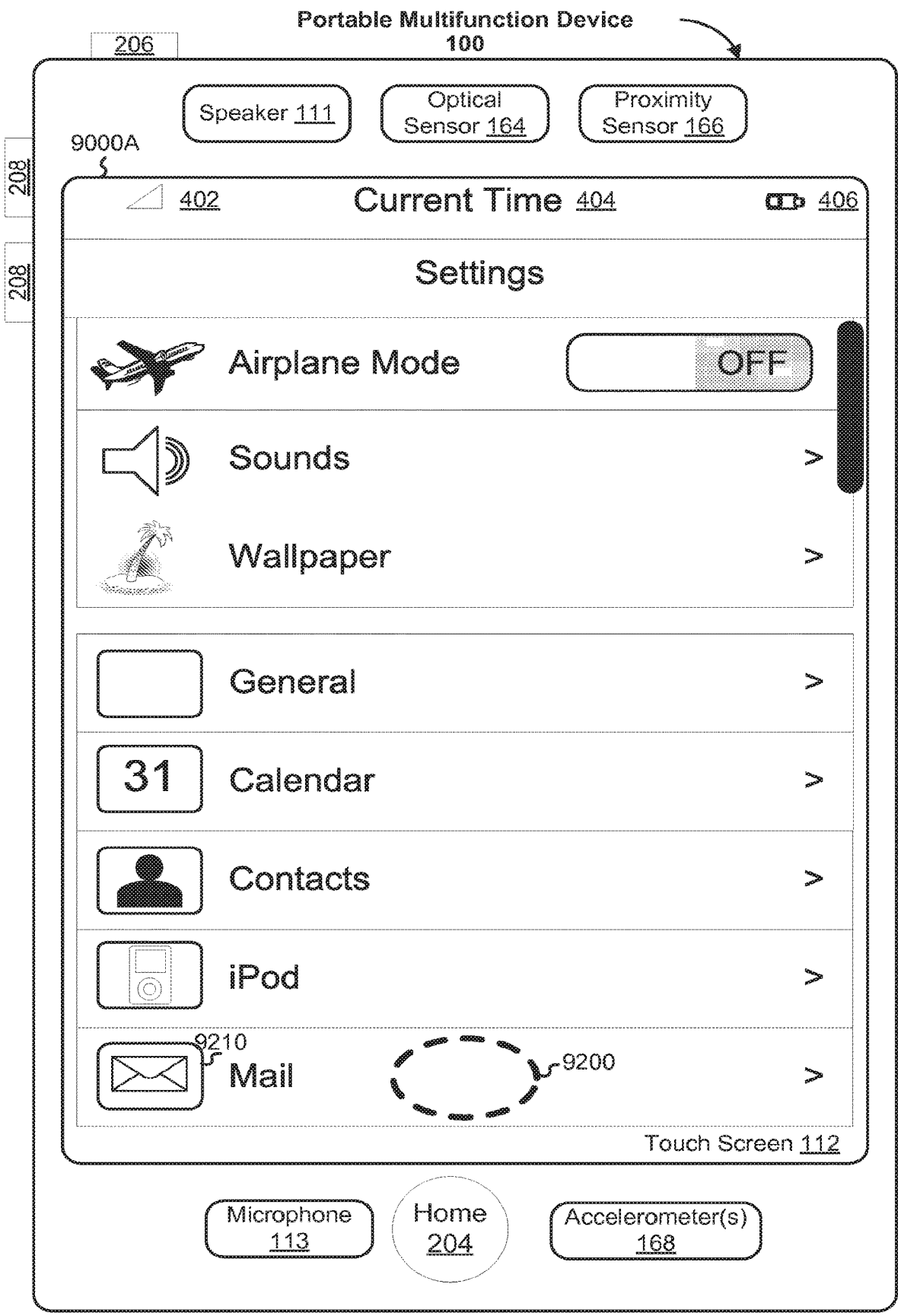
FIGS. 9A-9C illustrate exemplary user interfaces for creating and managing email settings and accounts in accordance with some embodiments.

FIG. 9A shows a device displaying a user interface with a settings menu. In response to detecting a user gesture 9200 on a mail icon 9210, the device displays a mail settings menu, such as in FIG. 9B.

Figure 9B:
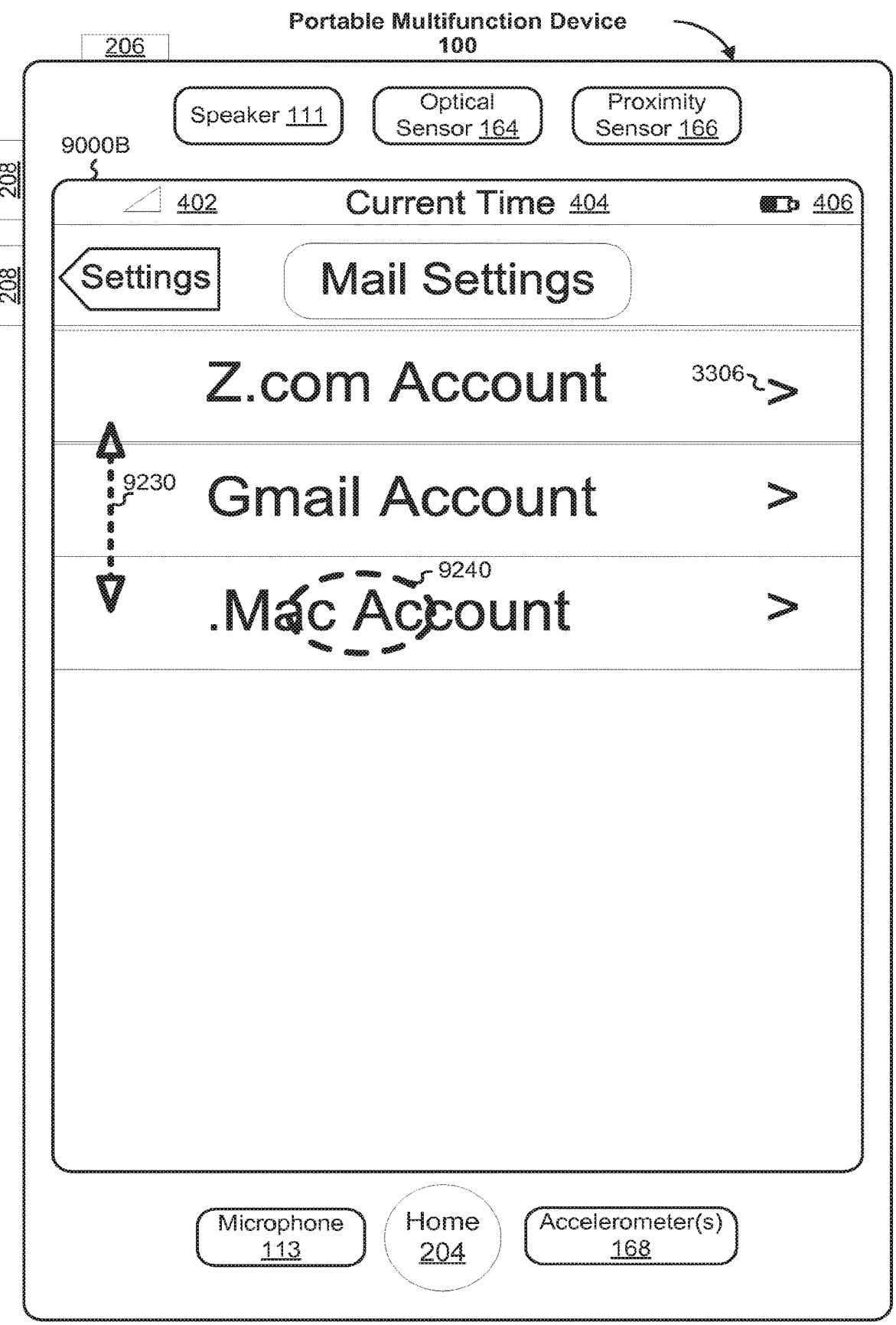

FIG. 9B shows a device displaying a user interface with a mail settings menu. In response to detecting a user gesture 9230, the device scrolls a menu of mail accounts. In response to detecting a user gesture 9240 on a respective account, the device displays a list of mail settings for the respective account.

Figure 9C:
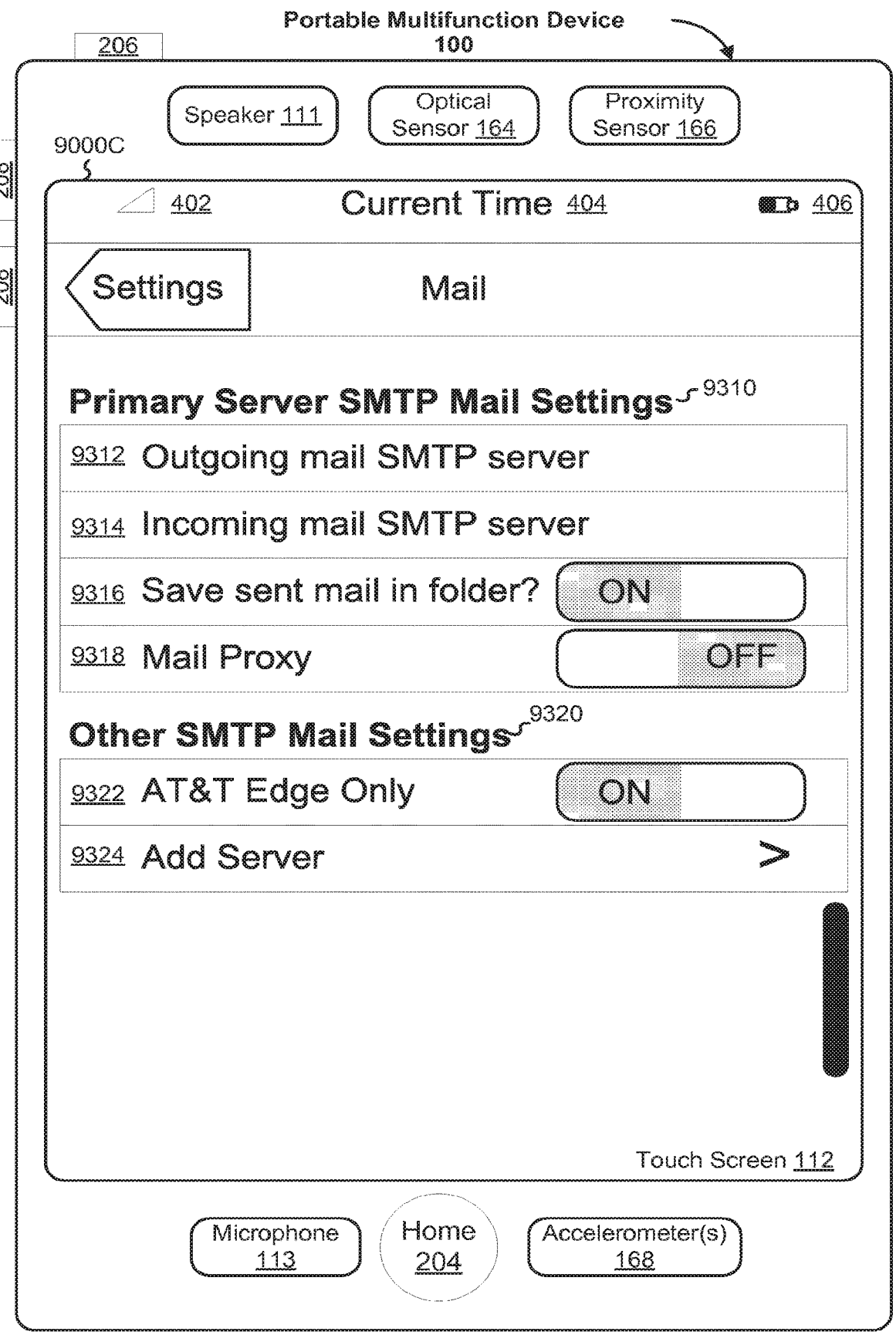

FIG. 9C shows a device displaying a user interface for adjusting SMTP mail settings. The device displays primary server SMTP mail settings 9310, including settings 9312, 9314, 9316, and 9318 in an exemplary embodiment. The device displays secondary server SMTP mail settings 9320, including 9322 in an exemplary embodiment. The device also displays an option 9324 to add an additional server.

In some embodiments, UI 9000A (FIG. 9A) includes the following elements, or a subset or superset thereof:
402, 404, and 406 as described above; and
mail settings icon 9210.

In some embodiments, UI9000B (FIG. 9B) includes the following elements, or a subset or superset thereof:
402, 404, and 406, as described above; and
Additional Information icons (e.g., ">") 3306, the activation of which may initiate display by the touch screen of additional details for the corresponding email account.

In some embodiments, UI9000C (FIG. 9C) includes the following elements, or a subset or superset thereof:
402, 404, and 406 as described above;
primary mail settings 9310, including exemplary options 9312, 9314, 9316, and 9318;
secondary mail settings 9320, including exemplary options 9322, and 9324.

Threaded Email

Figure 10A:
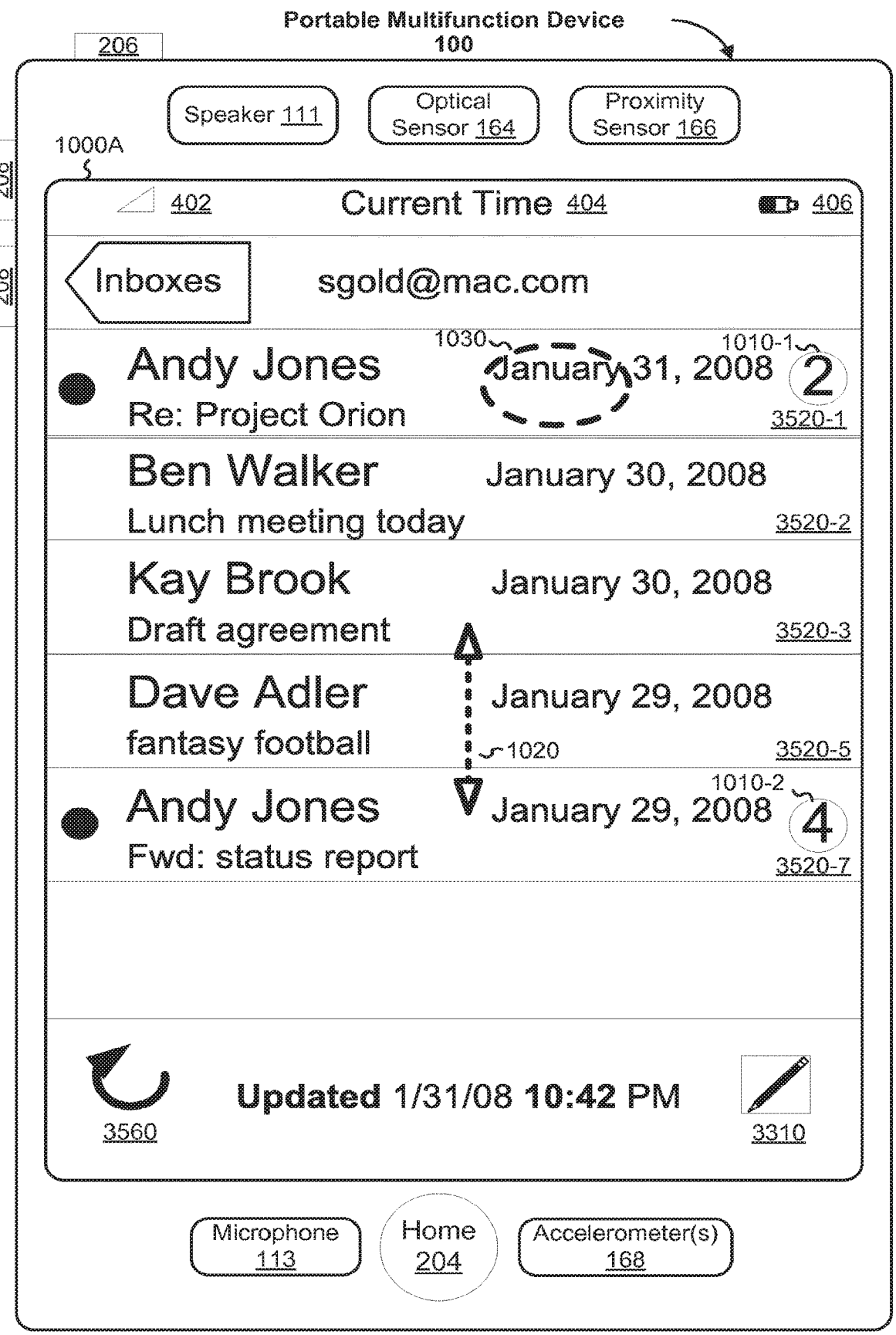
FIGS. 10A-10C illustrate an exemplary user interface for managing and accessing threaded email messages in accordance with some embodiments.
Figure 10B:
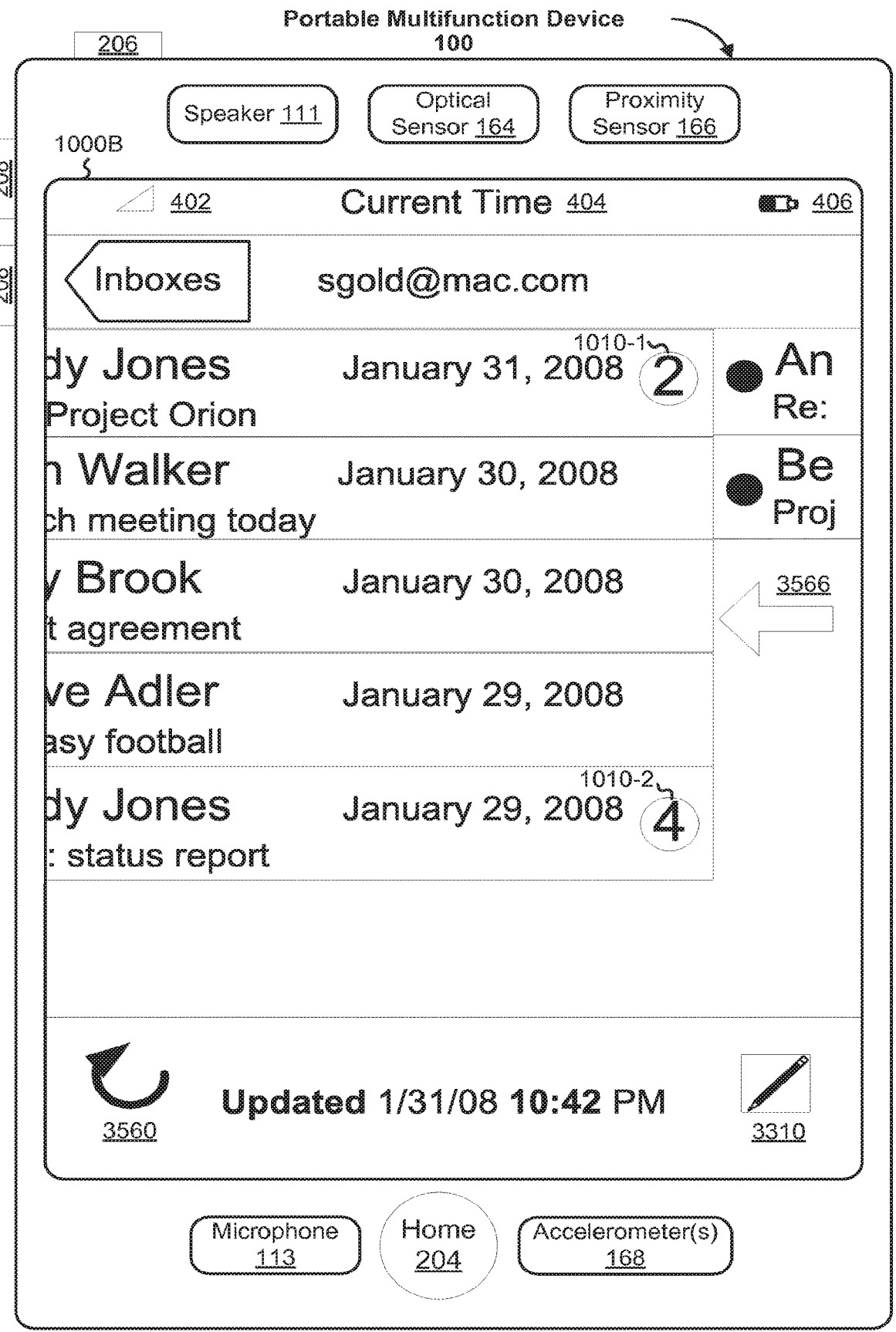
Figure 10C:
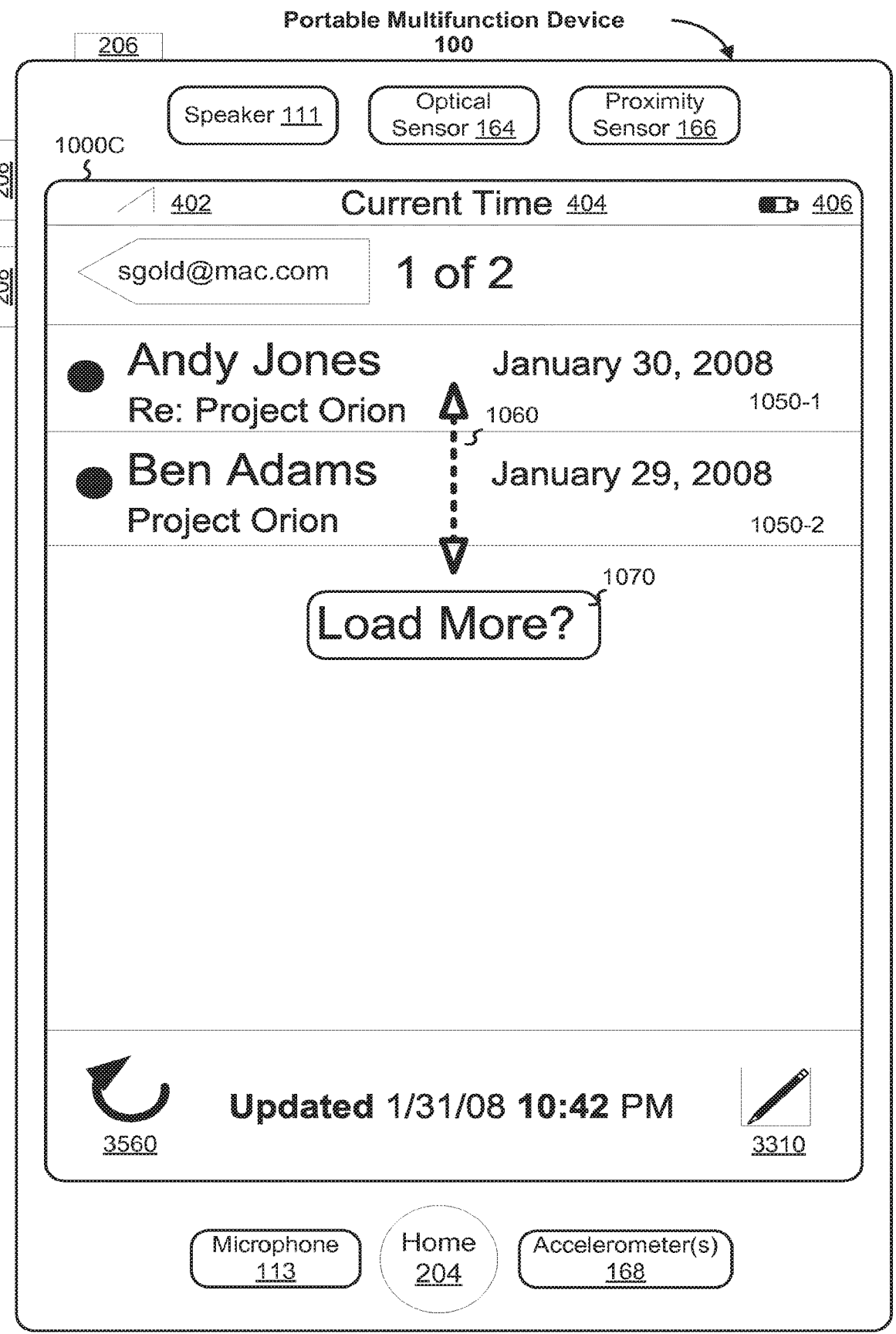

FIGS. 10A-10C illustrate an exemplary user interface for managing and accessing threaded email messages in accordance with some embodiments. In particular, FIG. 10A shows a device displaying in a user interface an inbox with a plurality of email descriptors 3520. The device displays a plurality of thread marker icons 1010, indicating that for each marked email descriptor 3520, there are other related emails in an email thread. The device scrolls the list in response to detecting a user gesture 1020. The device detects a user gesture 1030 on an email descriptor 3520-1 that is part of an email thread, and in response the device displays an animation (FIG. 10B) to UI 1000C (FIG. 10C).

In FIG. 10B, the device displays an animation 3566 of UI 1000A sliding off screen and UI 1000C sliding on screen. In an embodiment, the sliding motion is from right to left, but any slide direction could be used. In other embodiments, other animations such as fading, shredding, pixelating, etc. could be used to indicate a change. In FIG. 10B, as the device displays the email descriptors 3520 sliding off the screen, the device displays email descriptors 1050 related to the email thread selected in FIG. 10A sliding onto the screen.

FIG. 10C shows a device displaying in a user interface an email thread with a plurality of related emails descriptors 1050. In some embodiments, the device displays an icon 1070 to load more emails from a server or a network. In response to detecting a user gesture 1060, the device scrolls the emails descriptors 1050.

In some embodiments, UI1000A (FIG. 10A) includes the following elements, or a subset or superset thereof:
402, 404, 406, 3310, 3520 and 3560, as described above; and
a plurality of email thread marker icons 1010.

In some embodiments, UI1000B (FIG. 10B) includes the following elements, or a subset or superset thereof:
402, 404, 406, 1010, 3310, and 3560 as described above; and
An animation 3566.

In some embodiments, UI1000C (FIG. 10C) includes the following elements, or a subset or superset thereof:
402, 404, 406, 3310, and 3560, as described above;
a plurality of thread-related email descriptors 1050 and an icon 1070 to initiate loading of more emails.

Deleting and/or Moving Multiple Emails

Figure 11A:
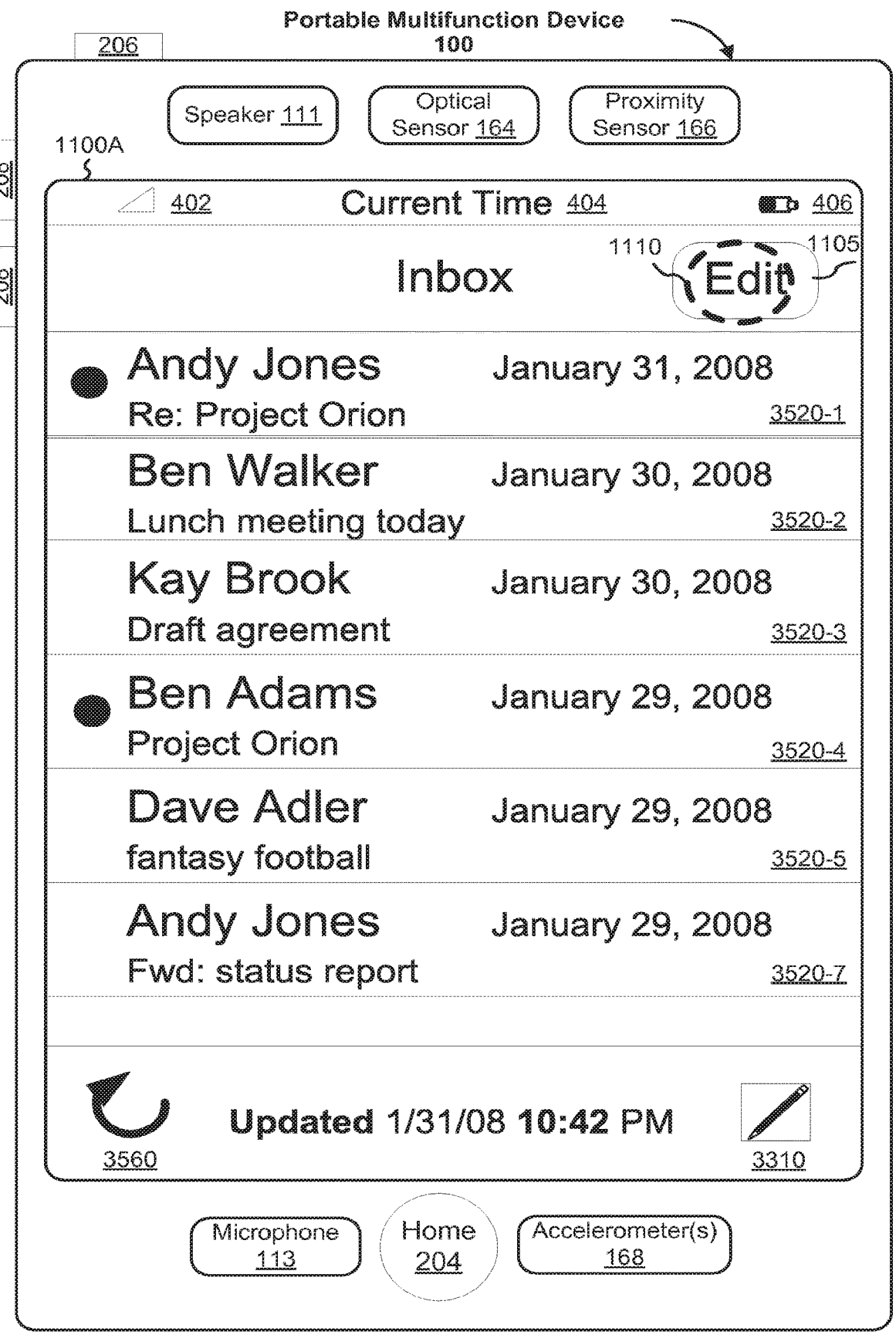
FIGS. 11A-11C illustrate exemplary user interfaces for deleting or moving multiple emails in accordance with some embodiments.
Figure 11B:
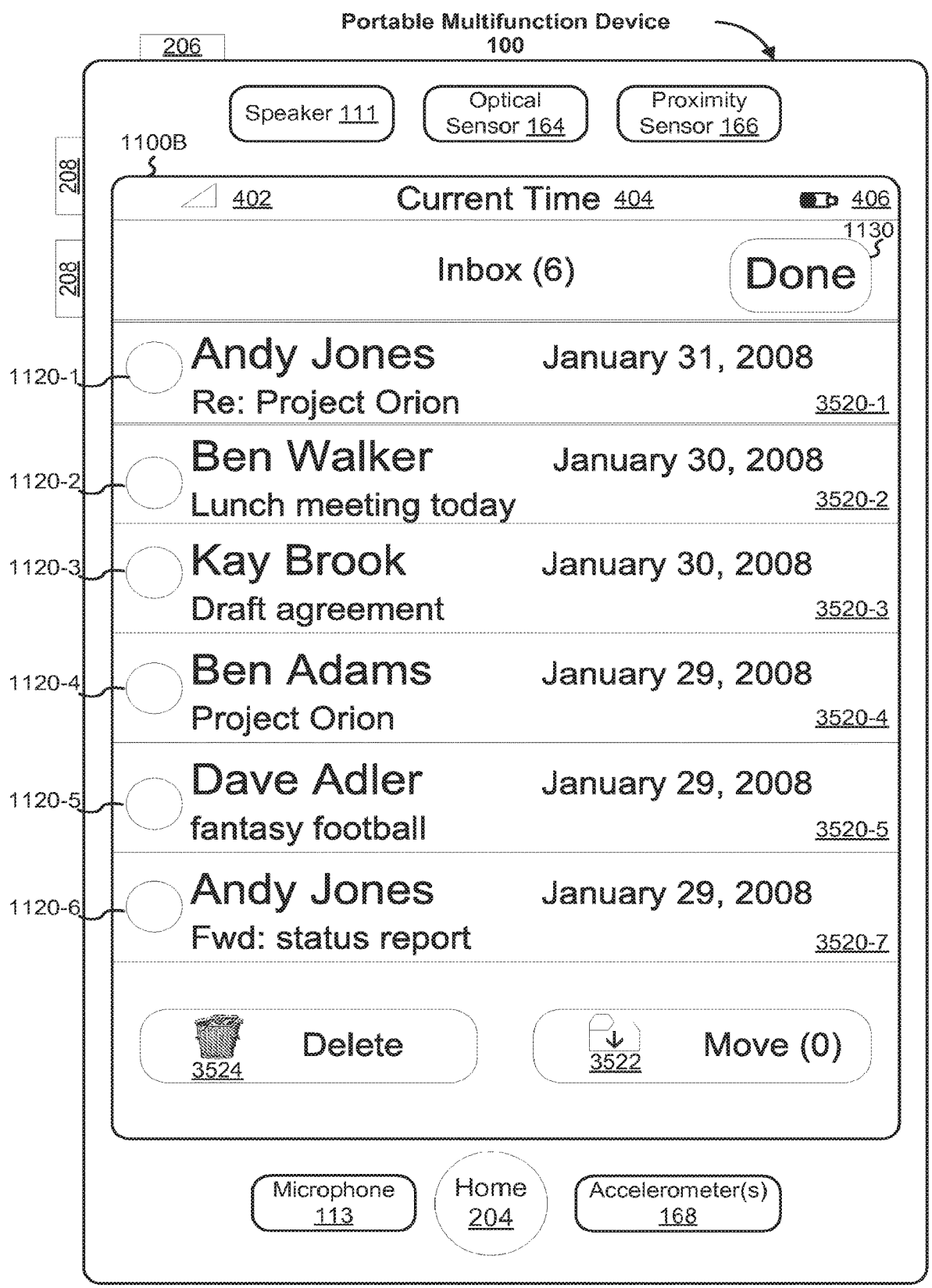
Figure 11C:
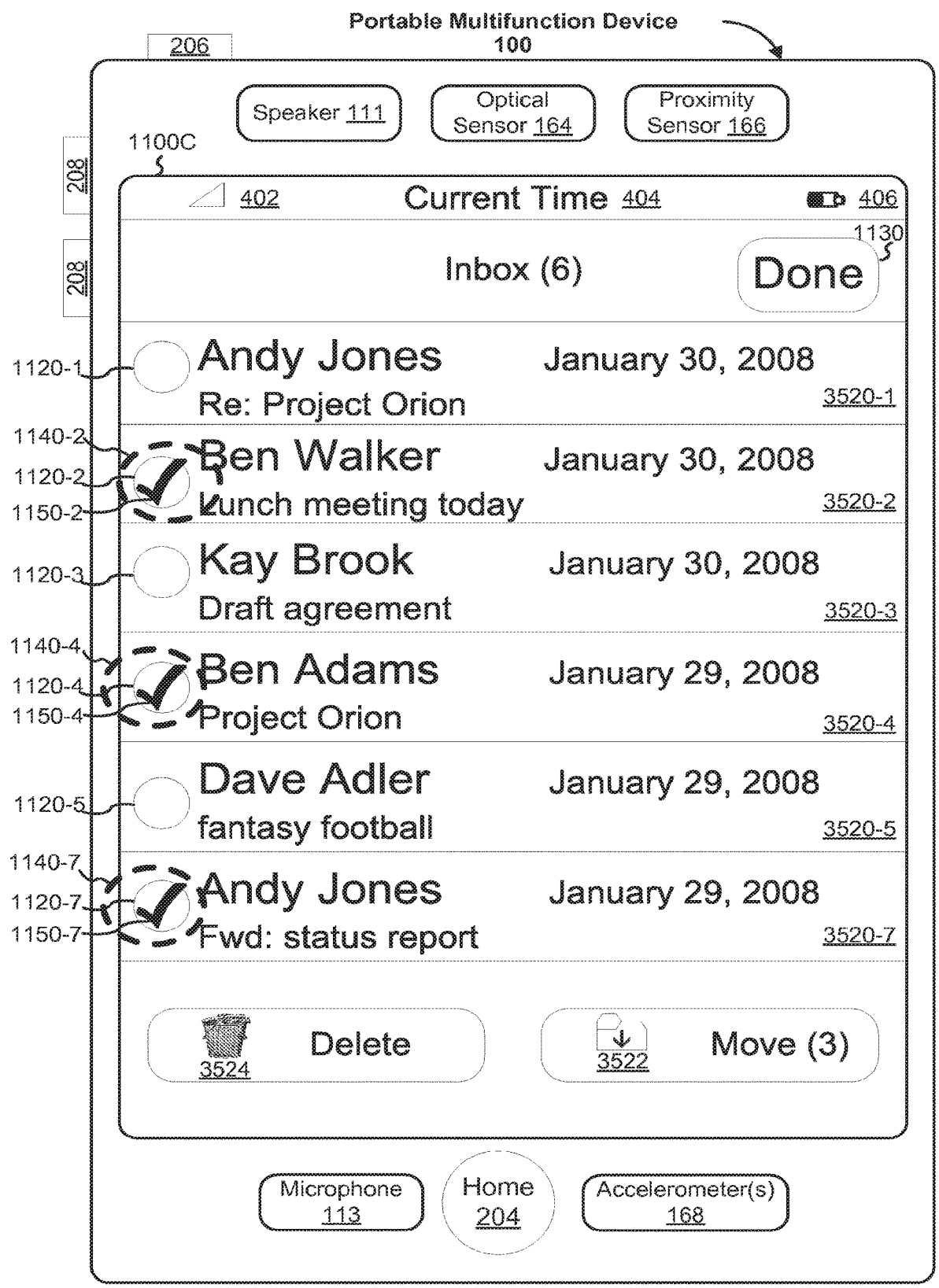

FIGS. 11A-11C illustrate exemplary user interfaces for deleting or moving multiple emails in accordance with some embodiments. In particular, FIG. 11A shows a device displaying in a user interface an inbox with a plurality of email descriptors 3520. The device displays 'Edit' option 1105. The device detects a user selection gesture 1110 on the edit option 1105, and in response, displays the user interface of FIG. 11B.

FIG. 11B shows a device displaying in a user interface an inbox with a plurality of email descriptors 3520. The device displays a 'Done' option 1130 that when activated ends the editing of the list of email descriptors 3520. Beside each email descriptor 3520, the device displays a selection icon 1120. In some embodiments, the device displays a 'Delete' icon 3524 and a 'Move' icon 3522. In some embodiments, the Move icon 3522 has a number corresponding to the number of selected emails.

FIG. 11C shows a device displaying in a user interface an inbox with a plurality of email descriptors 3520. In response to user selection gesture 1140 on a selection icon 1120, a selection mark 1150 (e.g., a check mark) is displayed and an updated number of selected emails is displayed in the 'Move' 2522 icon. In FIG. 11C the device displays three emails selected, in response to the device detecting three user selection gestures on the selection icons associated with the three emails.

In some embodiments. UI1100A (FIG. 11A) includes the following elements, or a subset or superset thereof:
402, 404, 406, 3310, 3520, 3560, as described above; and
an edit option 1105.

In some embodiments, UI 1100B (FIG. 11B) includes the following elements, or a subset or superset thereof:
402, 404, 406, 3310, 3520, 3560, as described above;
a delete option 3524;
a move option 3522;
an done option 1130; and
selection icons 1120.

In some embodiments. UI1100C (FIG. 11C) includes the following elements, or a subset or superset thereof:
- 402, 404, 406, 1120, 1130, 3520, 3522, 3524, as described above;
- selection marks (e.g., check marks) 1150.

FIGS. 12A-12I illustrate exemplary user interfaces for managing "From," "CC" and "BCC" information for emails in an email application in accordance with some embodiments.

In some embodiments, when a user opens a compose window to write an e-mail (including a reply to or forward of another email), in addition to the standard "To:" and "Subject:" lines associated with the email, a single blank line is displayed for "CC:/BCC:/From:" address field information. These fields are initially collapsed together in this manner as they are optional. That is, emails do not require CC: or BCC: addresses; and the From address in an email generally corresponds to the sender's default email address (e.g., the email address of the account from which the sender is sending the email). For example, if a user "sgold" replies to an email sent to their "z.com" account, the reply email will by default be identified as being sent by "sgold@z.com," without any intervention by the user. Similarly, a new email composed by sgold in their z.com email account would by default be identified as being sent by "sgold@z.com."

In contrast, in some embodiments, a user can specify an email address in the "From:" field of an email that differs from a default email address associated with that user. One reason for doing this is that a device 100 can be configured with multiple email accounts, all of which can be accessed from a unified inbox, as described above. The user might enter the desired "From:" address using a virtual keyboard, or they might select the "From:" address from a list of the addresses associated with email accounts that are available on the device 100. For example, a email account list displayed for a user might include the following choices: sgold@z.com, sgold@mac.com and sgold@gmail.com. This list can also identify the particular account that is the default account (which would be used by default when the user composes a new email).

In some embodiments, a user who wishes to enter information for any or all of these address fields first places the cursor in the corresponding area of the display (e.g., by tapping next to the collapsed "CC:/BCC:/From:" line), which in turn causes individual lines to be displayed respectively for the "CC:," "BCC:," and "From:" fields. The user can enter information into any of these fields by tapping the corresponding line of the display, which causes a virtual keyboard to be displayed for entry of address characters. Alternatively, a user can select email addresses for any of these fields from contact information accessible to the email program. Optionally, a default value can be displayed in the expanded "From:" field; the user can then choose to change or keep this default "From:" value.

When the user is finished entering address information (e.g., when the user starts to compose the body of the email), the "BCC:," "CC:" and "From" address fields are once again redisplayed in a compressed manner, which, among other advantages, conserves display space.

In some embodiments, information in the From, CC and BCC fields is compressed by eliminating individual display lines/regions for those address fields for which information was either not entered by the user, or which employ default values. For example, if the user enters an address for the "CC:" field, enters no address for the "BCC:" field, and keeps the default "From:" address value, upon entering the email compose mode, the compressed address would include a displayed line for the "CC:" address, and the "BCC:" and "From:" lines would be collapsed to be displayed as a "BCC:/From:" line.

Figure 12A:
FIGS. 12A-12I illustrate exemplary user interfaces for managing "From," "CC" and "BCC" information for emails in an email application in accordance with some embodiments.

In particular, FIG. 12A shows a device displaying in a user interface a soft keyboard and email address and subject fields. The device displays a name typed in the 'To' field, and the cursor 1205 is displayed in the 'To' field. The 'CC', 'BCC' and 'From' fields are displayed as empty and collapsed together. The figure shows the device detecting a contact 1210 on the collapsed 'CC/BCC/From' field. In response to detecting the contact 1210 (e.g. a finger gesture or a stylus contact) on the collapsed 'CC/BCC/From' field, the device expands these fields, as shown in FIG. 12B.

Figure 12B:

FIG. 12B shows a device displaying in a user interface a soft keyboard and email address and subject fields. The subject field is displayed partially below the soft keyboard. The device displays an email address of the user of the device in the 'From' field, and the cursor 1205 is displayed in the 'From' field.

Figure 12C:
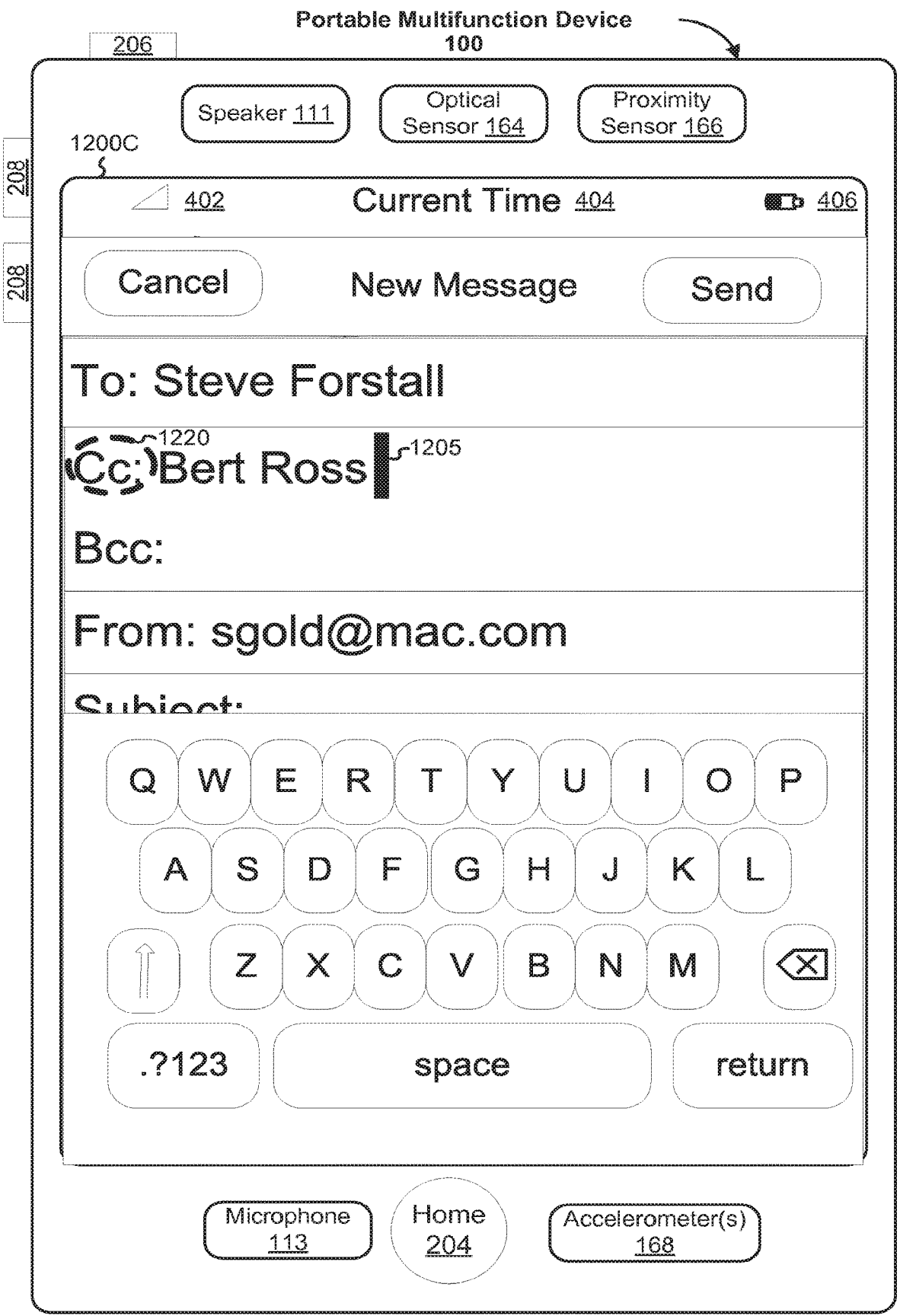

FIG. 12C shows a device displaying in a user interface a soft keyboard and email address and subject fields. The subject field is displayed partially below the soft keyboard. In response to detecting a contact 1220 (e.g., a finger gesture or a stylus contact) on the 'CC' field, the device displays the cursor 1205 in this field. The device displays a name input in the 'CC' field.

Figure 12D:
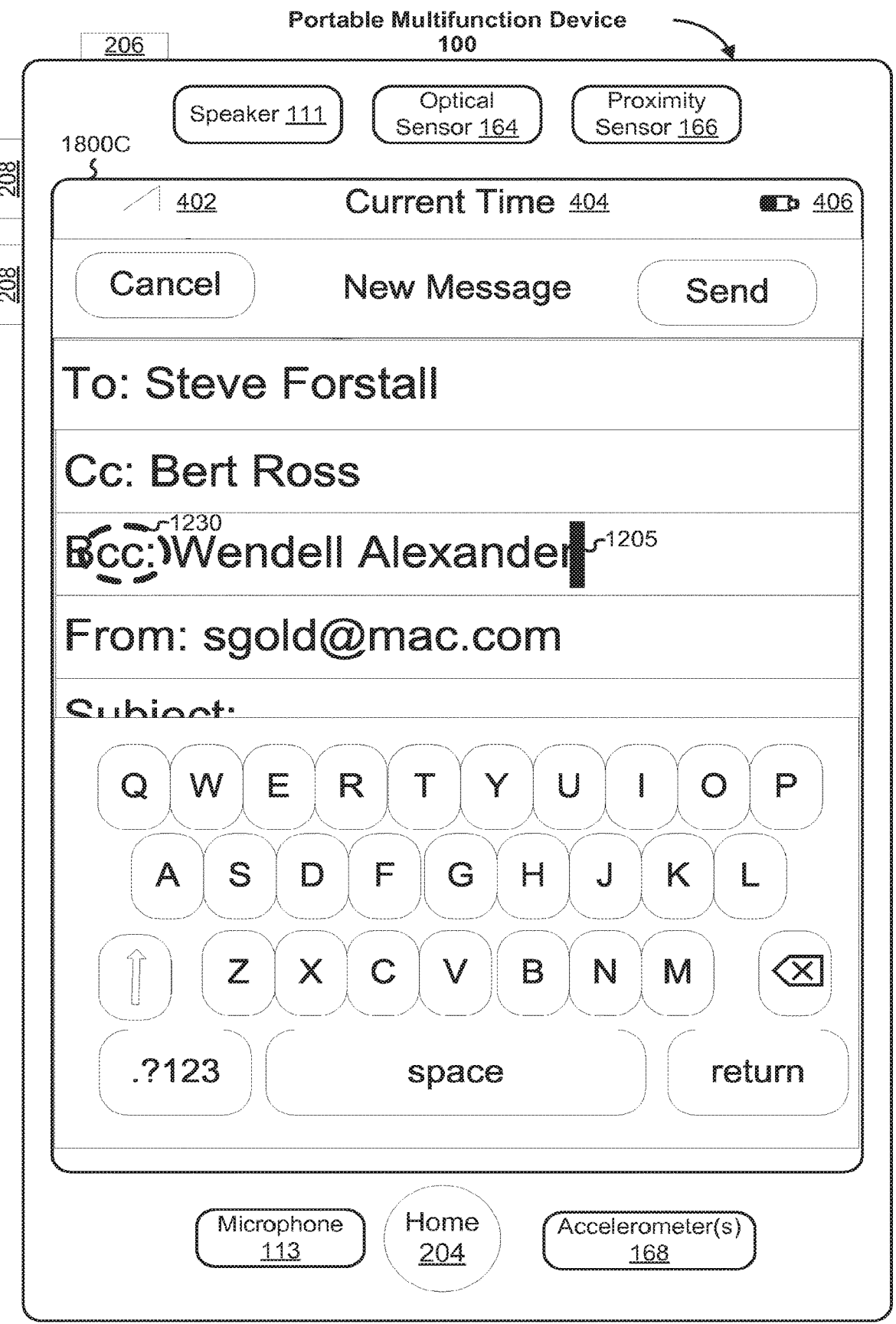

FIG. 12D shows a device displaying in a user interface a soft keyboard and email address and subject fields. The subject field is displayed partially below the soft keyboard. In response to detecting a contact 1230 (e.g. a finger gesture or a stylus) on the 'BCC' field, the device displays the cursor 1205 in this field. The device displays a name input in the 'BCC' field.

Figure 12E:
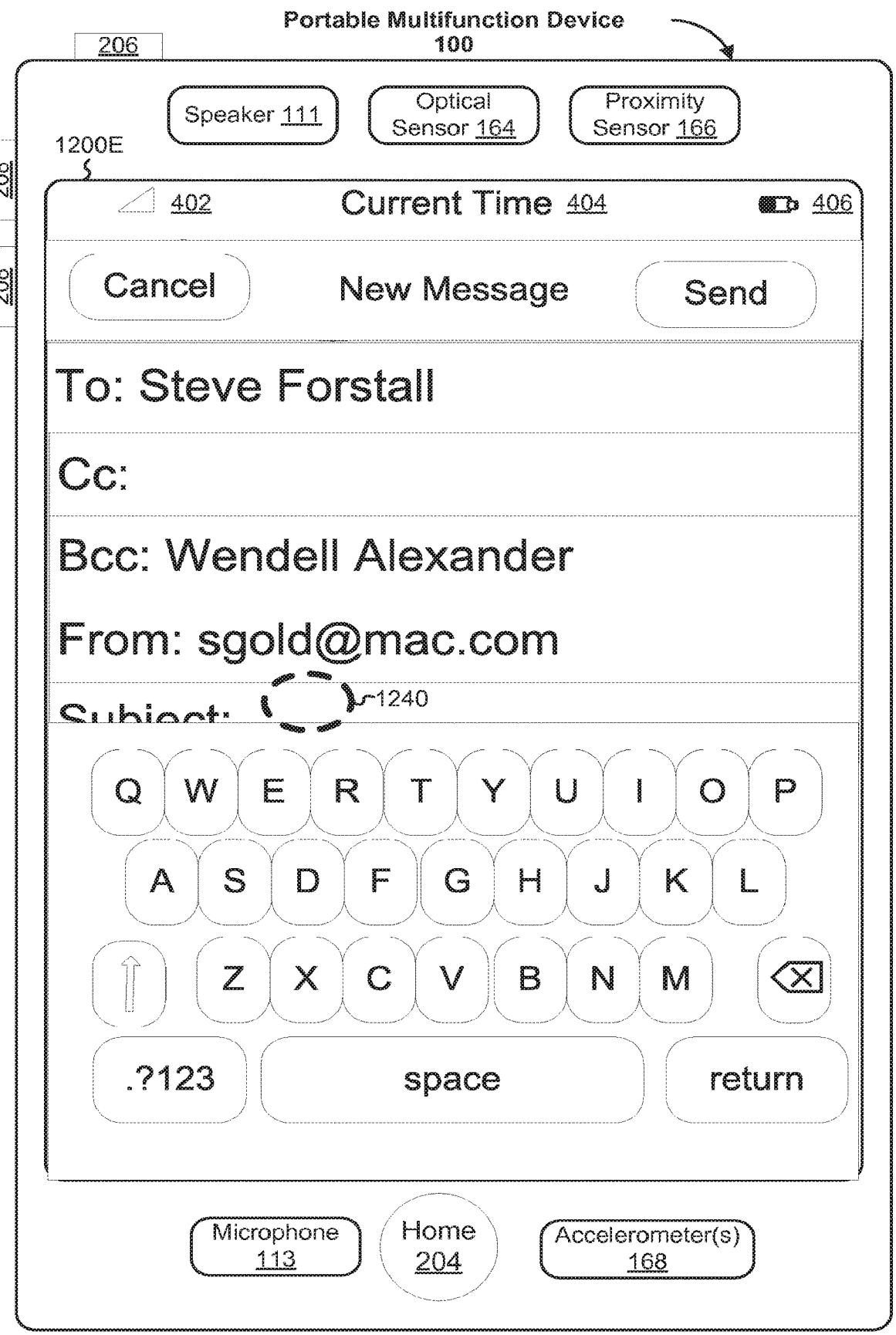

FIG. 12E shows a device displaying in a user interface a soft keyboard and email address and subject fields. The subject field is displayed partially below the soft keyboard. In response to detecting a contact 1240 (e.g. a finger gesture or a stylus contact) on the subject field, the device collapses the 'From' field and any unfilled 'CC' and 'BCC' fields, as shown in FIG. 12F.

Figure 12F:
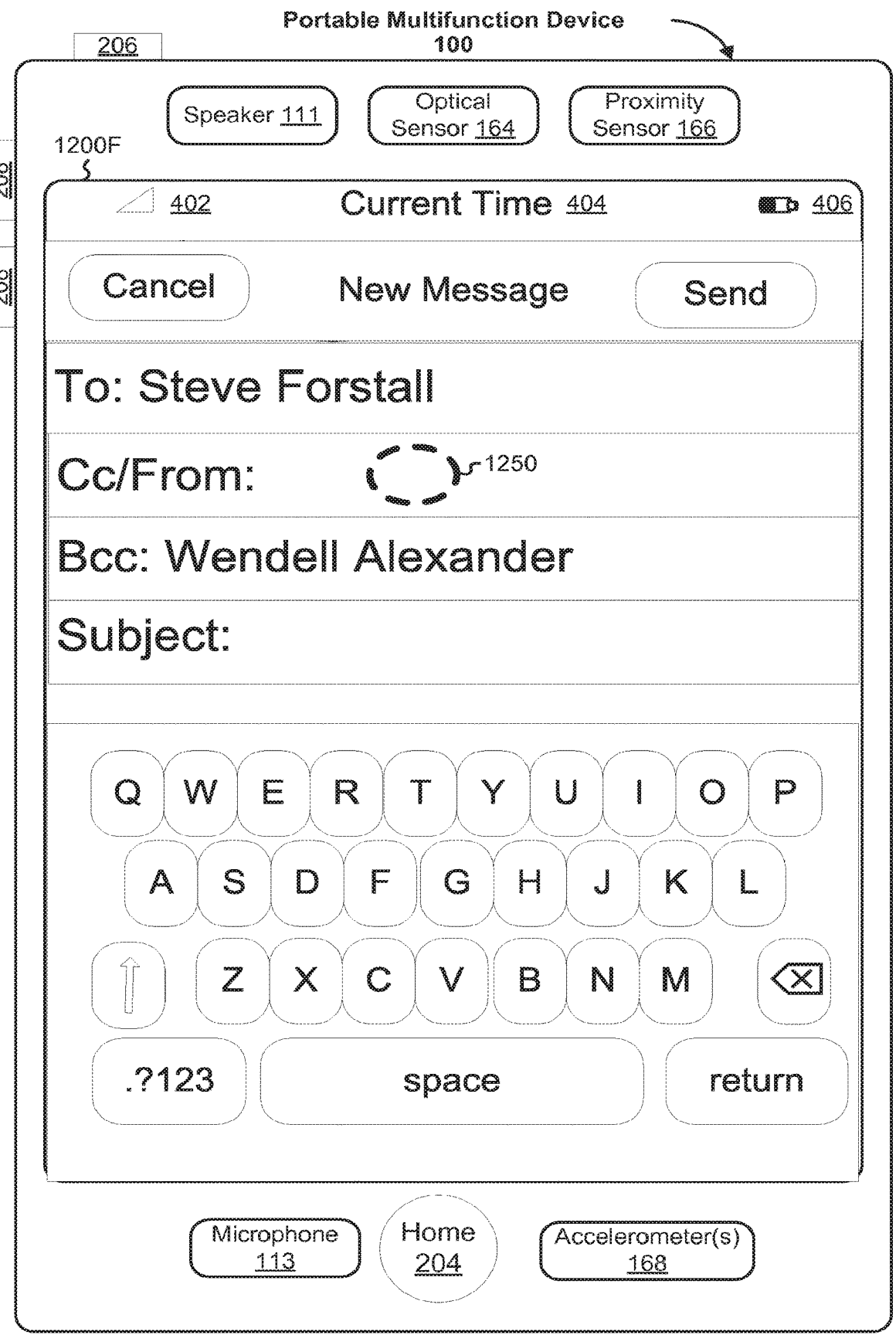

FIG. 12F shows a device displaying in a user interface a soft keyboard and email address and subject fields. In FIG. 12F, the 'CC' and 'From' fields are displayed collapsed together. The device detects a contact 1250 (e.g. a finger gesture or a stylus) on the collapsed 'CC/From' field, and in response displays these expanded fields as shown in FIG. 12G.

Figure 12G:
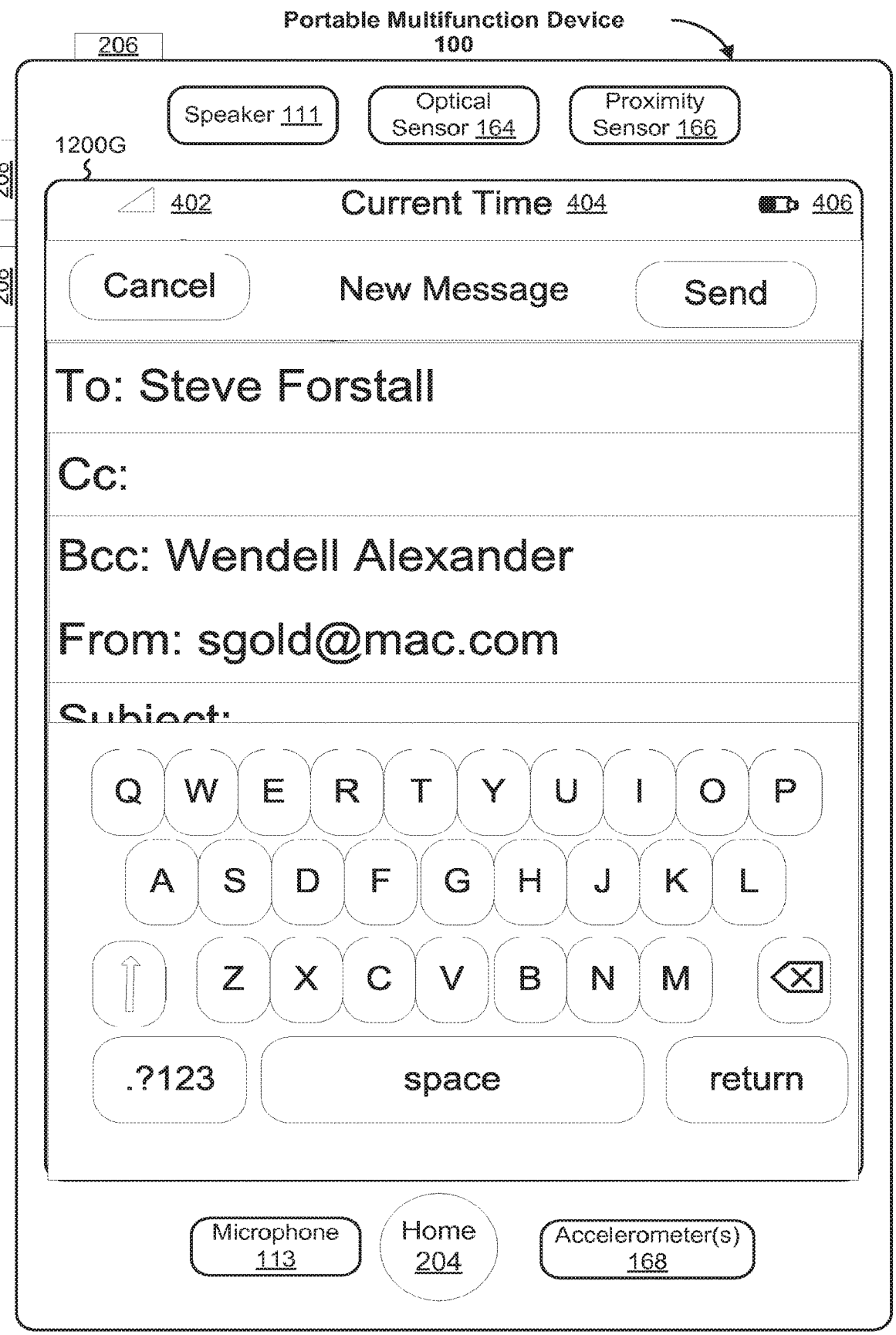

FIG. 12G shows a device displaying in a user interface a soft keyboard and email address and subject fields. The subject field is displayed partially below the soft keyboard.

Figure 12H:
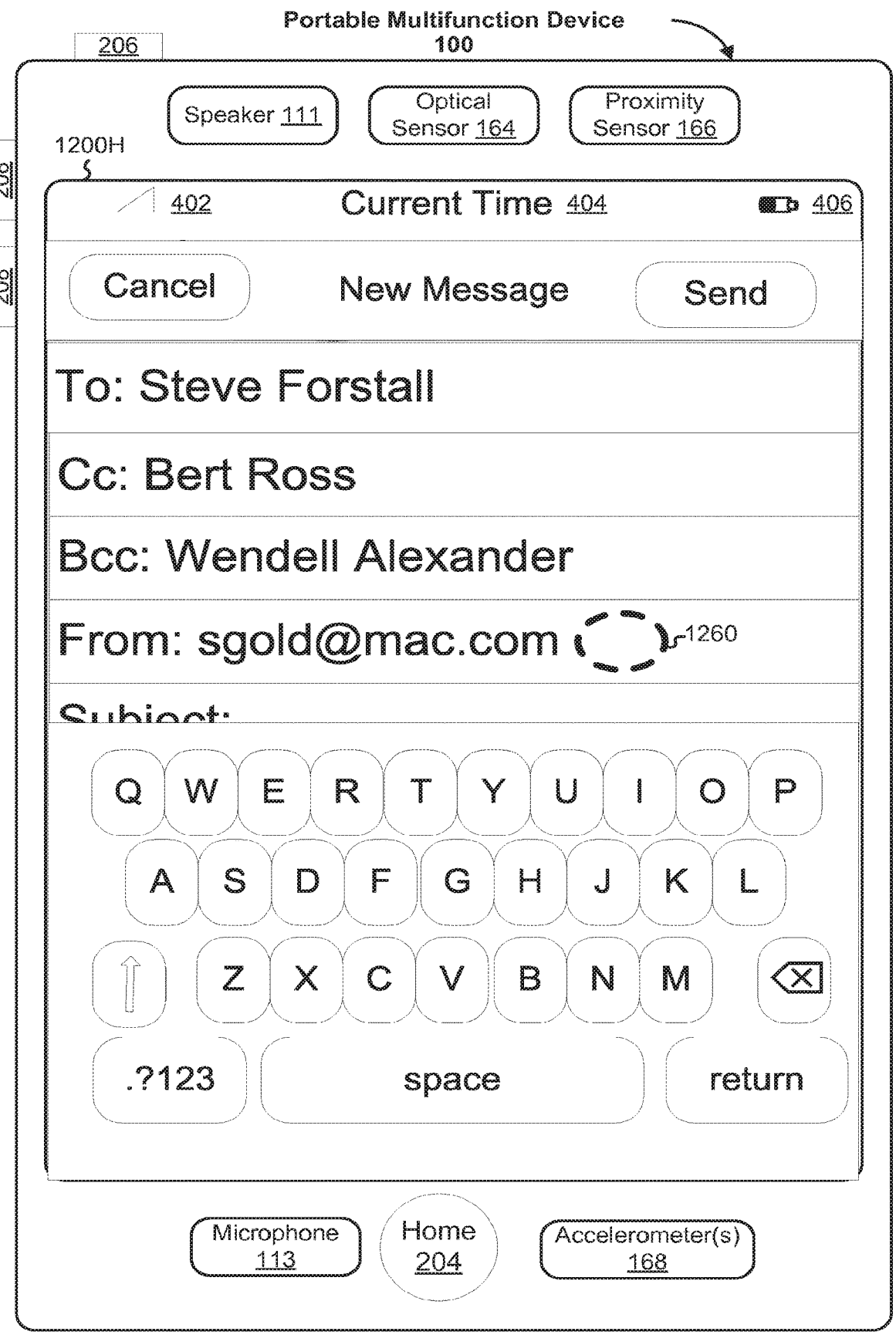

FIG. 12H shows a device displaying in a user interface a soft keyboard and email address and subject fields. The subject field is displayed partially below the soft keyboard. The device detects a contact 1260 (e.g. a finger gesture or a stylus) on the 'From' field, and in response displays a set of 'From' sender options as shown in FIG. 12I.

Figure 12I:
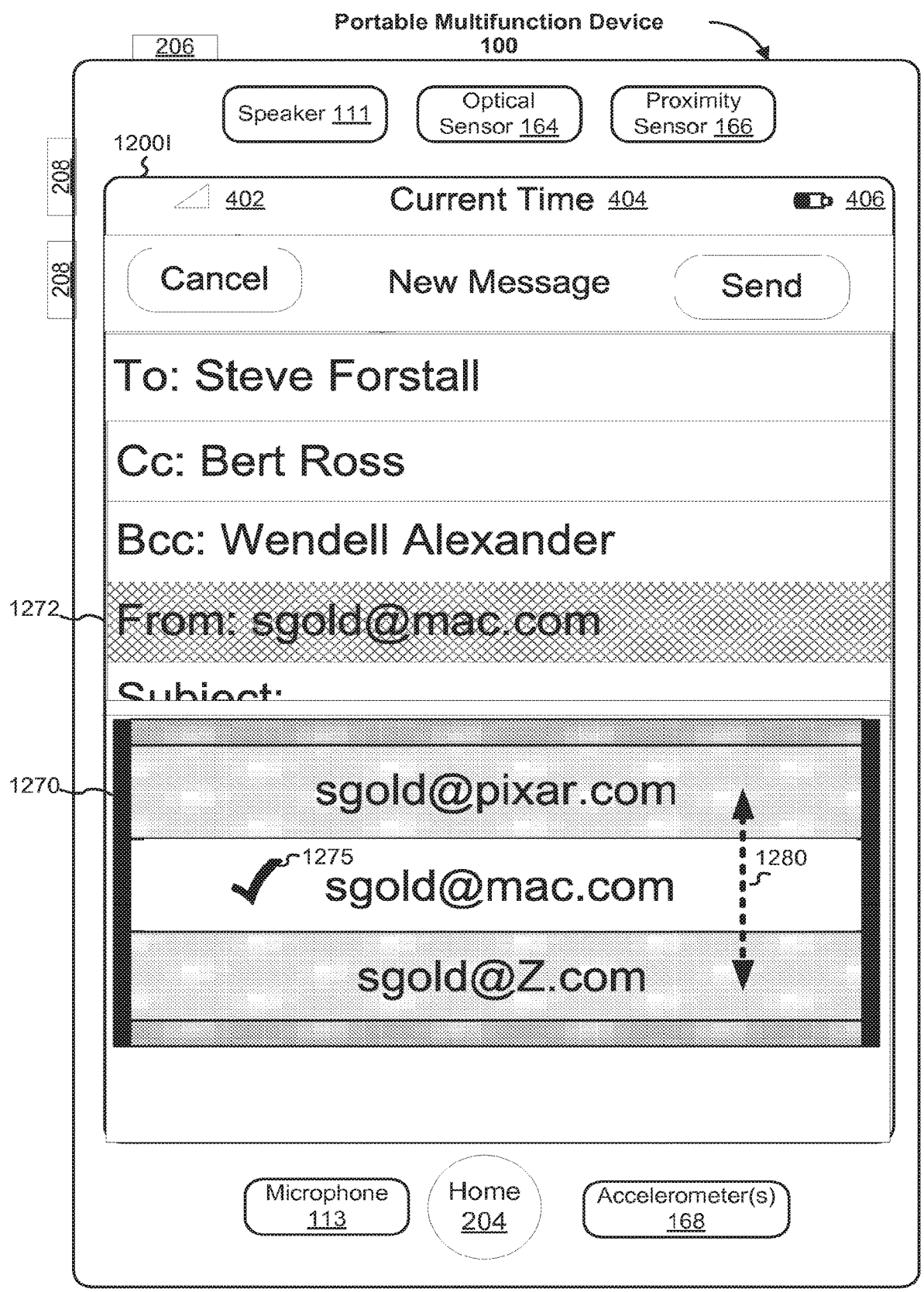

FIG. 12I shows a device displaying in a user interface a set of sender options and email address and subject fields. The subject field is displayed partially below the sender options. The device displays the 'From' field as highlighted, 1272 and displays the sender options as a scrollable list and/or 'wheel' of options 1270. The device displays the wheel scrolling vertically in response to a user gesture 1280. The currently selected sender option (e.g., sgold@mac.com) is displayed in the middle of the wheel and is marked 1275, for example by a check mark. User selection of one of the other user email addresses in the scrollable list (e.g., by a finger tap gesture) lets the user change the email account from which the email is sent.

In some embodiments, UI 1200A-UI 1200H (FIGS. 12A-12H) include the following elements, or a subset or superset thereof:

- 402, 404, and 406, as described above; and
- a cursor 1205.

In some embodiments, UI1200I (FIG. 12I) includes the following elements, or a subset or superset thereof:

- 402, 404, 406, as described above;
- a highlight 1272;
- a sender options list and/or 'wheel' 1270; and
- a check mark 1275 next to the selected sender email address.

Methods of Operating a Mail Application

FIGS. 13A-13H are flow diagrams illustrating methods 1300, 1340, 1360, 1370, 1390, 1420, 1450, and 1470, respectively, of operating a mail application in accordance with some embodiments. The methods are performed on a portable electronic device with a touch screen display (e.g., portable multifunction device 100).

In a method 1300 shown in FIG. 13A, a portable electronic device having a display switches (1302) between electronic inboxes that can be accessed from the electronic device. Method 1300 provides a simple and intuitive way for a user to switch between a first inbox and a second inbox. This is a convenient way to change the inbox viewed with a minimum of user actions required.

The device displays (1304) a first icon while displaying first contents of a first inbox. In some embodiments, the first icon includes (1306) status information related to the inboxes corresponding to the inbox selection icons. In some embodiments, the status information is conveyed (1308) using display attributes of the first icon. In some embodiments, the device updates (1310) the status information by changing color of at least a portion of the first icon to indicate presence of new items in at least one of the inboxes corresponding to the inbox selection icons.

In response to user selection of the first icon, the device displays (1312) a set of inbox selection icons. In some embodiments, each of the inbox selection icons includes (1314) an inbox identifier for a respective electronic inbox. In some embodiments, each of the inbox selection icons includes (1316) an inbox counter indicating a total number of unread items in the respective electronic inbox.

In some embodiments, the device displays (1318) status information related to the inboxes corresponding to the inbox selection icons. In some embodiments, the status information is conveyed (1320) using a badge associated with the icon.

In some embodiments, displaying the inbox selection icons includes partially displaying the first inbox as a peel-away page and displaying the inbox selection icons in display space not occupied by the partially displayed first inbox (1322). In some embodiments, the peel-away page is represented as one or more of: a curled-up page or a folded page (1324). In some embodiments, in response to user selection of the partially displayed first inbox, the device displays (1326) first contents of the first inbox.

In response to user selection of one of the inbox selection icons, the device displays (1328) second contents of a second inbox corresponding to the inbox selection icon selected by the user.

In a method 1340 shown in FIG. 13B, a portable electronic device (e.g., device 100) having a display displays (1342) contents of a plurality of electronic inboxes that can be accessed from the electronic device.

The device displays (1344) a first icon while displaying first contents of a first inbox.

In response to user selection of the first icon, the device displays (1346) unified contents of the plurality of electronic inboxes. In some embodiments, the electronic inboxes comprise email inboxes (1348).

In some embodiments, the device determines (1350) the plurality of electronic inboxes automatically by identifying accounts used by the user on the electronic device.

In some embodiments, the device displays (1352) a second icon while displaying the unified contents of the plurality of electronic inboxes. In response to user selection of the second icon, the device displays (1354) a list of the plurality of electronic inboxes. In response to user selection of an item in the list of the plurality of electronic inboxes, the device displays (1356) contents of a second inbox corresponding to the selected item.

In a method 1360 shown in FIG. 13C, an electronic device with a display and a user input device provides (1362) a list of SMTP servers that can be employed by a user of the electronic device to send email.

When an attempt to send an email message via a first one of the SMTP servers is unsuccessful, the device repeatedly attempts (1364) to send the email message via second ones of the SMTP servers until the email is successfully sent.

In a method 1370 shown in FIG. 13D, an electronic device with a display and a user input device receives (1372) a plurality of emails at the electronic device.

The device identifies (1374) at least a first email that is part of an email thread having a plurality of thread members.

In some embodiments, identifying the first email that is part of an email thread includes: determining (1378) degree of similarity of at least a subject and a sender identity associated with the thread members; and determining (1380) that the first email is part of the first thread based on the degree of similarity and one or more heuristics relating to determining thread membership. In some embodiments, the heuristics are applied (1382) computationally by the electronic device.

The device displays (1384) a plurality of email descriptors corresponding to at least a subset of the emails, including the first email.

The device displays (1386) a first thread descriptor in conjunction with the email descriptor that corresponds to the first email. The first thread descriptor indicates a number of the thread members associated with the first thread.

In response to user selection of the email descriptor corresponding to the first email, the device displays (1388) a second set of email descriptors for the email thread that includes the first email.

In a method 1390 shown in FIG. 13E, an electronic device with a display and a user input device receives (1392) a plurality of emails at the electronic device.

The device identifies (1394) at least a first email that includes one or more associated image files.

the device displays (1396) a representation of the one or more associated image files in context of the first email.

In response to user selection of the representation, the device displays (1398) a set of image file options including an option to display a slideshow of the attached photos.

In response to user selection of the option to display a slideshow of the attached photos, the device displays (1400) the slideshow of the attached photos.

In some embodiments, if there are other non-image file attachments to the first email, the device selects (1402) only the image-file attachments for display in the slideshow.

In a method 1420 shown in FIG. 13F, a portable electronic device having a touch screen display displays (1422) an email message having a plurality of photo attachments.

The device detects (1424) a user gesture on or near the touch screen display. In some embodiments, the detected user gesture is a finger touch on a displayed image corresponding to one of the photo attachments (1426). In some embodiments, the detected user gesture is a finger touch on a displayed icon corresponding to one of the photo attachments (1428).

In response to detecting the gesture, the device displays (1430) a plurality of options for managing the plurality of photo attachments, including an option to save the plurality of photo attachments and an option to display a slideshow of the plurality of photo attachments.

In some embodiments, the device detects (1432) user selection of the option to display a slideshow. In response to detecting the user selection of the option to display a slideshow, the device displays (1434) a slideshow of the plurality of photo attachments.

In some embodiments, the device detects (1436) user selection of the option to save the plurality of photo attachments. In response to detecting the user selection of the option to save the plurality of photo attachments, the device saves (1438) the plurality of photo attachments.

In some embodiments, the slideshow includes display of a sequence of photos corresponding to the plurality of photo attachments and display (1440) of a file name for each respective photo in the slideshow when the respective photo is displayed.

In some embodiments, the slideshow includes display of a sequence of photos corresponding to the plurality of photo attachments, including: the device detects a finger swipe gesture during display of the slideshow; and, in response to detecting the finger swipe gesture, the device advances (1442) the slideshow to a next photo in the sequence of photos.

In a method 1450 shown in FIG. 13G, an electronic device with a display and a user input device displays (1452) a first user interface in which a user can compose an email. The first user interface includes a collapsed field corresponding to CC, BCC and From address information.

In response to user selection of the collapsed field, the device displays (1454) first individual CC, BCC and From fields and the device enables a user to enter address values in at least one of the first CC, BCC and From fields. In some embodiments, enabling the user to enter address values comprises displaying (1456) a virtual keyboard that overlays a portion of the first interface.

In some embodiments, following completion of user entry of address values in at least one of the first CC, BCC and From fields, the device displays (1458) a recollapsed field in place of the collapsed field. The recollapsed field includes: at least one second individual field displaying respective values of any of the CC, BCC and From fields entered by the user and, if there are at least two of the CC, BCC or From fields in which the user did not enter a respective value, a second collapsed field corresponding to such at least two of the CC, BCC or From fields.

In some embodiments, the device enables (1460) the user to enter an address value in the From field that is different from a default From address value associated with the user.

In a method 1470 shown in FIG. 13H, an electronic device with a display and a user input device provides (1472) a list of SMTP servers that can be employed by the electronic device to send email.

When the device fails to successfully transmit a first email via one of the listed SMTP servers, the device attempts (1474) to transmit the first email via another of the listed SMTP servers.

In some embodiments, one of the SMTP servers is characterized as a default server and other SMTP servers on the list of SMTP servers are characterized as alternate servers. A first attempt by the electronic device to send the email is via the default SMTP server (1476).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   on a portable electronic device having a touch screen display, switching between electronic inboxes that can be accessed from the electronic device, including:
   while displaying first contents of a first inbox on the touch screen display, displaying a first icon;
   in response to receiving a first input on the touch screen display to select the first icon, displaying a set of inbox selection icons, wherein the set of inbox selection icons includes a unified inbox selection icon and a second inbox selection icon;
   in response to receiving a second input on the touch screen display:
   in accordance with a determination that the second input corresponds to the second inbox selection icon, displaying second contents of a second inbox corresponding to the selected inbox selection icon;
   in accordance with a determination that the second input corresponds to the unified inbox selection icon, displaying a portion of the first contents of the first inbox interleaved with a portion of the second contents of the second inbox, wherein the portion of the first contents of the first inbox includes a portion of a first message and the portion of the second contents of the second inbox includes a portion of a second message; and
   in response to receiving a third input on the touch screen display while displaying the portion of the first contents of the first inbox interleaved with the portion of the second contents of the second inbox:
   updating the first contents of the first inbox and the second contents of the second inbox; and
   displaying a time indication of when the first contents of the first inbox and the second contents of the second inbox were last updated.

2. The method of claim 1, wherein each of the inbox selection icons includes an inbox identifier for a respective electronic inbox.

3. The method of claim 2, wherein one or more of the inbox selection icons further includes an inbox counter indicating a total number of new items in the respective electronic inbox.

4. The method of claim 1, wherein the first inbox corresponds to a first email account and the second inbox corresponds to a second email account.

5. The method of claim 1, wherein the first inbox and the second inbox are respective email accounts that are each associated with a user of the portable electronic device.

6. The method of claim 1, while displaying first contents of a first inbox on the touch screen display, the second contents of the second inbox are not displayed.

7. The method of claim 1, further comprising:
in response to receiving the first input on the touch screen display to select the first icon, displaying a descriptor indicating a number of unread emails in the second inbox, wherein the descriptor is adjacent to the second inbox selection icon.

8. An electronic device, comprising:
a touch screen display;
one or more processors;
one or more input devices;
a memory; and
one or more programs, wherein the one or more programs are stored in memory and configured to be executed by the one or more processors, the one or more programs including instructions for:
switching between electronic inboxes that can be accessed from the electronic device, including:
while displaying first contents of a first inbox on the touch screen display, displaying a first icon;
in response to receiving a first input on the touch screen display to select the first icon, displaying a set of inbox selection icons, wherein the set of inbox selection icons includes a first unified inbox selection icon and a second inbox selection icon;
in response to receiving a second input on the touch screen display:
in accordance with a determination that the second input corresponds to the second inbox selection icon, displaying second contents of a second inbox corresponding to the selected inbox selection icon;
in accordance with a determination that the second input corresponds to the first unified inbox selection icon, displaying a portion of the first contents of the first inbox interleaved with a portion of the second contents of the second inbox, wherein the portion of the first contents of the first inbox includes a portion of a first message and the portion of the second contents of the second inbox includes a portion of a second message; and
in response to receiving a third input on the touch screen display while displaying the portion of the first contents of the first inbox interleaved with the portion of the second contents of the second inbox:
updating the first contents of the first inbox and the second contents of the second inbox; and
displaying a time indication of when the first contents of the first inbox and the second contents of the second inbox were last updated.

9. The electronic device of claim 8, wherein each of the inbox selection icons includes an inbox identifier for a respective electronic inbox.

10. The electronic device of claim 9, wherein one or more of the inbox selection icons further includes an inbox counter indicating a total number of new items in the respective electronic inbox.

11. The electronic device of claim 8, wherein the first inbox corresponds to a first email account and the second inbox corresponds to a second email account.

12. The electronic device of claim 8, wherein the first inbox and the second inbox are respective email accounts that are each associated with a user of the portable electronic device.

13. The electronic device of claim 8, the one or more programs further include instructions for:
while displaying first contents of a first inbox on the touch screen display, the second contents of the second inbox are not displayed.

14. The electronic device of claim 8, the one or more programs further include instructions for:
in response to receiving the first input on the touch screen display to select the first icon, displaying a descriptor indicating a number of unread emails in the second inbox, wherein the descriptor is adjacent to the second inbox selection icon.

15. A non-transitory computer readable storage medium storing one or more programs, the one or more programs comprising instructions, which when executed by one or more processors of an electronic device with a touch screen display and one or more input devices, cause the device to:
switch between electronic inboxes that can be accessed from the electronic device, including:
while displaying first contents of a first inbox on the touch screen display, display a first icon;
in response to receiving a first input on the touch screen display to select the first icon, display a set of inbox selection icons, wherein the set of inbox selection icons includes a unified inbox selection icon and a second inbox selection icon;
in response to receiving a second input on the touch screen display:
in accordance with a determination that the second input corresponds to the second inbox selection icon, display second contents of a second inbox corresponding to the selected inbox selection icon;
in accordance with a determination that the second input corresponds to the unified inbox selection icon, displaying a portion of the first contents of the first inbox interleaved with a portion of the second contents of the second inbox, wherein the portion of the first contents of the first inbox includes a portion of a first message and the portion of the second contents of the second inbox includes a portion of a second message; and
in response to receiving a third input on the touch screen display while displaying the portion of the first contents of the first inbox interleaved with the portion of the second contents of the second inbox:
updating the first contents of the first inbox and the second contents of the second inbox; and
displaying a time indication of when the first contents of the first inbox and the second contents of the second inbox were last updated.

16. The non-transitory computer readable storage medium of claim 15, wherein each of the inbox selection icons includes an inbox identifier for a respective electronic inbox.

17. The non-transitory computer readable storage medium of claim 16, wherein one or more of the inbox selection icons further includes an inbox counter indicating a total number of new items in the respective electronic inbox.

18. The non-transitory computer readable storage medium of claim 15, wherein the first inbox corresponds to a first email account and the second inbox corresponds to a second email account.

19. The non-transitory computer readable storage medium of claim 15, wherein the first inbox and the second inbox are respective email accounts that are each associated with a user of the portable electronic device.

20. The non-transitory computer readable storage medium of claim 15, the one or more programs comprising instructions further cause the device to:
   while displaying first contents of a first inbox on the touch screen display, the second contents of the second inbox are not displayed.

21. The non-transitory computer readable storage medium of claim 15, the one or more programs comprising instructions further cause the device to:
   in response to receiving the first input on the touch screen display to select the first icon, display a descriptor indicating a number of unread emails in the second inbox, wherein the descriptor is adjacent to the second inbox selection icon.

* * * * *

UNITED STATES PATENT AND TRADEMARK OFFICE
CERTIFICATE OF CORRECTION

PATENT NO. : 11,057,335 B2
APPLICATION NO. : 15/277800
DATED : July 6, 2021
INVENTOR(S) : Stephen O. Lemay Page 1 of 1

It is certified that error appears in the above-identified patent and that said Letters Patent is hereby corrected as shown below:

In the Claims

In Column 31, Line 32, Claim 8, before "unified" delete "first".

In Column 31, Line 41, Claim 8, before "unified" delete "first".

Signed and Sealed this
Twenty-seventh Day of August, 2024

Katherine Kelly Vidal
*Director of the United States Patent and Trademark Office*